(12) United States Patent
Nishimura

(10) Patent No.: US 10,645,015 B2
(45) Date of Patent: May 5, 2020

(54) PACKET PROCESSING DEVICE, TRANSMISSION APPARATUS, PACKET PROCESSING METHOD, AND STORAGE MEDIUM

(71) Applicant: FUJITSU LIMITED, Kawasaki-shi, Kanagawa (JP)

(72) Inventor: Kazuto Nishimura, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/191,516

(22) Filed: Nov. 15, 2018

(65) Prior Publication Data

US 2019/0158411 A1 May 23, 2019

(30) Foreign Application Priority Data

Nov. 17, 2017 (JP) .................................. 2017-222026

(51) Int. Cl.
*H04L 12/841* (2013.01)
*H04L 12/24* (2006.01)
*H04L 12/26* (2006.01)

(52) U.S. Cl.
CPC .......... *H04L 47/283* (2013.01); *H04L 41/142* (2013.01); *H04L 43/022* (2013.01); *H04L 43/04* (2013.01); *H04L 43/0858* (2013.01); *H04L 43/16* (2013.01); *H04L 43/18* (2013.01)

(58) Field of Classification Search
None
See application file for complete search history.

(56) References Cited

U.S. PATENT DOCUMENTS

| | | | | |
|---|---|---|---|---|
| 2010/0214942 A1* | 8/2010 | Du | ....................... | H04L 43/0876 370/252 |
| 2014/0115186 A1* | 4/2014 | Weston | ................. | H04L 69/163 709/235 |
| 2015/0029892 A1* | 1/2015 | Cha | ......................... | H04L 43/10 370/253 |
| 2018/0006956 A1* | 1/2018 | Bush | ........................ | H04Q 9/00 |
| 2019/0069257 A1* | 2/2019 | Iwakiri | ............. | H04W 56/0045 |

FOREIGN PATENT DOCUMENTS

JP 2001-177660 6/2001

* cited by examiner

*Primary Examiner* — Mohammad S Adhami
(74) *Attorney, Agent, or Firm* — Fujitsu Patent Center

(57) ABSTRACT

A packet processing device includes a memory; and a processor configured to acquire an amount of packets arriving in each first section length as a first sampling value, determine a plurality of temporary periods based on a multiple of the first section length, calculate, for each of the temporary periods, a statistical value obtained by quantifying a bias in the amount of packets arriving in each first section length based on the first sampling value, estimate the temporary period having a maximum statistical value as a neighborhood period, acquire an amount of packets arriving in each second section length as a second sampling value, determine a plurality of neighborhood temporary periods around the neighborhood period, calculate a statistical value for each neighborhood temporary period based on the second sampling value, and estimate the neighborhood temporary period having the maximum statistical value as a true period of the arriving packets.

15 Claims, 20 Drawing Sheets

PACKET PROCESSING DEVICE, TRANSMISSION APPARATUS, PACKET PROCESSING METHOD, AND STORAGE MEDIUM

CROSS-REFERENCE TO RELATED APPLICATION

This application is based upon and claims the benefit of priority of the prior Japanese Patent Application No. 2017-222026, filed on Nov. 17, 2017, the entire contents of which are incorporated herein by reference.

FIELD

The embodiments discussed herein are related to a packet processing device, a transmission apparatus, a packet processing method, and a storage medium.

BACKGROUND

A centralized radio access network (C-RAN) including a baseband unit (BBU) and a remote radio head (RRH) has recently been studied for the realization of the fifth generation mobile communication system (5G). As for a mobile front haul (MFH) line between the BBU and the RRH, there has been studied the adoption of a common public radio interface (CPRI) method for transmitting radio analog signals almost without any change.

In a communication system connected to the MFH line, information is handled as layer 2 packets. Therefore, a network is shared with a mobile back haul (MBH) line, a wired network, or the line that connects between the base stations. However, in the communication system, output delay occurs when MFH packets from the MFH line compete with other packets, for example, MBH packets from the MBH line. Therefore, priority control processing for suppressing such output delay is demanded. In the priority control processing, subsequent high-priority packets are preferentially read before queued low-priority packets. Thus, output delay of the high-priority packets, that is, the MFH packets may be suppressed.

However, in the priority control processing, when the high-priority packets arrive during read of the low-priority packets, the read operation of the high-priority packets is stopped until the read output of the low-priority packets being read is completed. As a result, wait of up to about 1 packet occurs. When a link rate is 1 Gbps and a packet length is 9000 bytes, for example, output delay of about 7 μ seconds occurs. In the MFH line, output delay is desirably 100 μ seconds or less between the RRH and the BBU. Therefore, in the case of a multimode configuration, this 1 packet output delay may not be ignored.

Time sensitive networking (TSN) of the institute of electrical and electronics engineers (IEEE) 802.1 has been studied as another method for suppressing the output delay. The TSN includes a time aware shaper (TAS) method of the IEEE 802.1 Qbv as a data plane function to suppress packet output delay. As the related art, Japanese Laid-open Patent Publication No. 2001-177660 and the like are disclosed, for example.

For example, a communication system is assumed, including a plurality of packet switches adopting the TAS method. In this case, each of the packet switches has to adjust opening and closing timing of each gate in the entire communication system, considering the transmission timing at the transmission end of MFH packets as high-priority packets as well as transmission delay for each gate of the packet switch so as to preferentially output the MFH packets. In consideration of the above circumstances, it is desirable that output delay of specific packets may be suppressed.

SUMMARY

According to an aspect of the embodiments, a packet processing device includes a memory; and a processor coupled to the memory and configured to acquire an amount of packets arriving in each first section length as a first sampling value, determine a plurality of temporary periods based on a multiple of the first section length, calculate, for each of the plurality of temporary periods, a statistical value obtained by quantifying a bias in the amount of packets arriving in each first section length based on the first sampling value sorted for each temporary period, estimate the temporary period having a maximum statistical value, among the statistical values calculated for each temporary period, as a neighborhood period, acquire an amount of packets arriving in each second section length different from the first section length as a second sampling value, determine a plurality of neighborhood temporary periods, which are temporary periods around the neighborhood period, calculate a statistical value for each neighborhood temporary period based on the second sampling value sorted for each neighborhood temporary period, and estimate the neighborhood temporary period having the maximum statistical value, among the statistical values calculated for each neighborhood temporary period, as a true period of the arriving packets.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Hereinafter, with reference to the drawings, detailed description is given of embodiments of a packet processing device, a transmission apparatus, a packet processing method, and a packet processing program disclosed in the present application. The embodiments are not intended to limit the disclosed technology. The following embodiments may be combined in any manner which is not logically contradictory.

Embodiment 1

Figure 1:
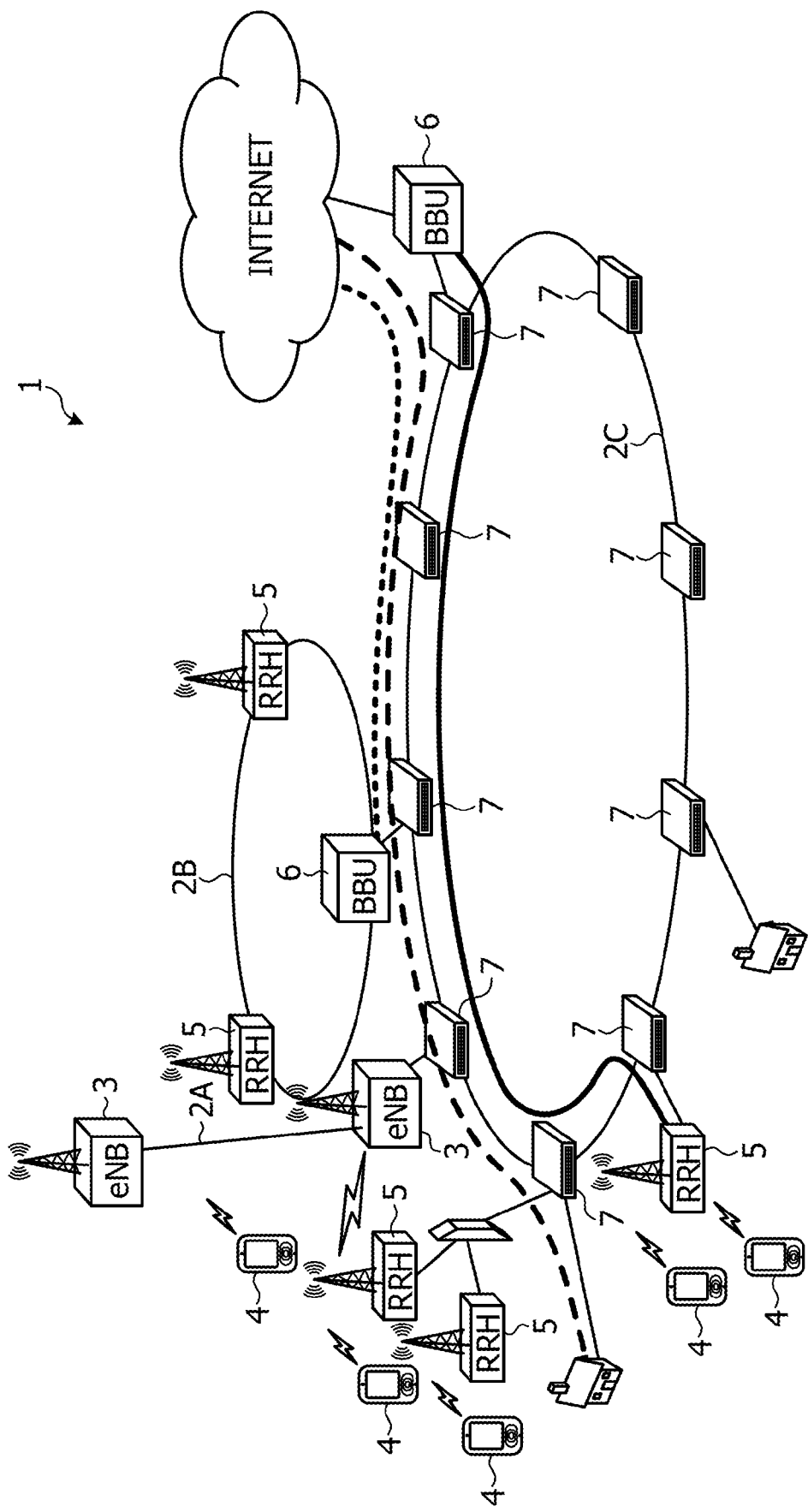
FIG. 1 is an explanatory diagram illustrating an example of a communication system of Embodiment 1.

FIG. 1 is an explanatory diagram illustrating an example of a communication system 1 of Embodiment 1. The communication system 1 illustrated in FIG. 1 includes an MBH line 2A, an MFH line 2B, and a backbone line 2C. The MBH line 2A is a line connecting between a plurality of base stations (eNB: evolved Node B) 3. The base stations 3 connect wirelessly to radio terminals 4 through radio antennas. The MFH line 2B is a line connecting between an RRH 5 and a BBU 6. The RRH 5 connects wirelessly to the radio terminals 4. The MFH line 2B adopts a CPRI method for transmitting radio signals between the RRH 5 and the BBU 6 through MFH packets of an L2 frame. The backbone line 2C connects also to another wired network, besides the MBH line 2A and the MFH line 2B, to transmit various packets such as MBH packets from the MBH line 2A and MFH packets from the MFH line 2B. As for the MFH packets, suppression of output delay is strongly demanded compared with the MBH packets.

The BBU 6 has a scheduling function for radio sections. The scheduling function is a function to determine various elements such as user data, a code rate, and a modulation method, for example, to be transmitted to one sub-frame. The BBU 6 divides the user data into L2 frames, and transmits MFH packets to the RRH 5. For example, the BBU 6 transmits the MFH packets to the RRH 5 at sub-frame intervals, for example, every 1 m seconds. The RRH 5 divides user data in the received radio signal into L2 frames, and transmits MFH packets to the BBU 6.

The backbone line 2C is a line for arranging a plurality of packet switches 7 to transmit the MBH packets from the MBH line 2A and the MFH packets from the MFH line 2B. The packet switches 7 transmit various packets other than the MBH packets and the MFH packets. The packet switches 7 adopt a time aware shaper (TAS) method of the IEEE 802.1 Qbv to output the MFH packets as high-priority packets.

Figure 2:
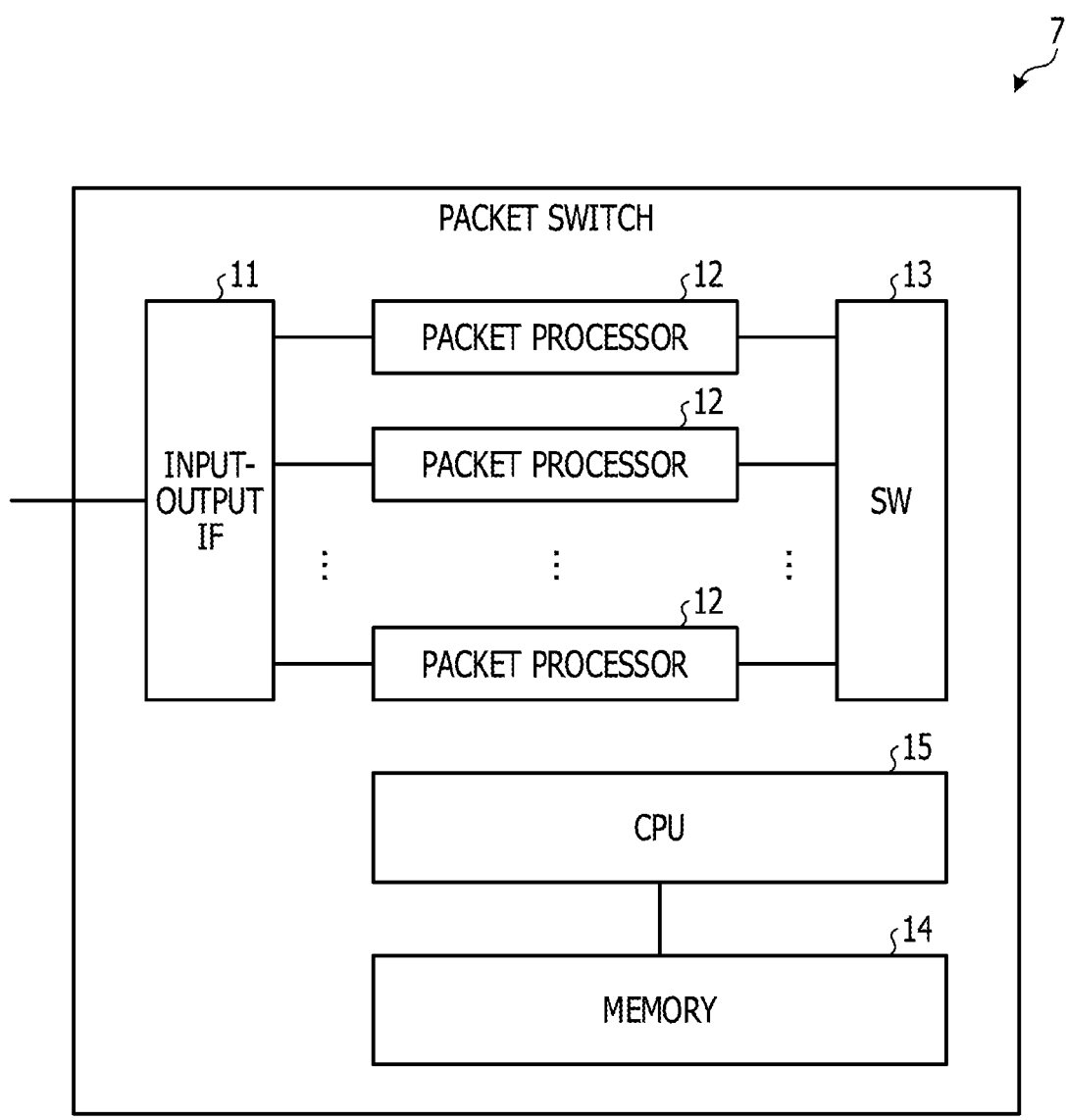
FIG. 2 is an explanatory diagram illustrating an example of a hardware configuration of a packet switch.

FIG. 2 is an explanatory diagram illustrating an example of a hardware configuration of the packet switch 7. The packet switch 7 illustrated in FIG. 2 includes an input-output interface (IF) 11, a plurality of packet processors 12, a switch (SW) 13, a memory 14, and a central processing unit (CPU) 15. The packet switch 7 is a transmission apparatus, for example. The input-output IF 11 is an IF to input and output packets by connecting to various lines such as the backbone line 2C. The input-output IF 11 connects to the RRH 5 and BBU 6 connected to the backbone line 2C as well as to the other packet switches 7, for example. The packet processor 12 is a packet processing device such as an IF card to execute packet processing adopting the TAS method. The SW 13 is a switch card to switch between input and output of the packet processor 12. The memory 14 is a region to store various information. The CPU 15 controls the entire packet switch 7. The memory 14 and the CPU 15 are mounted on a control card.

Figure 3:
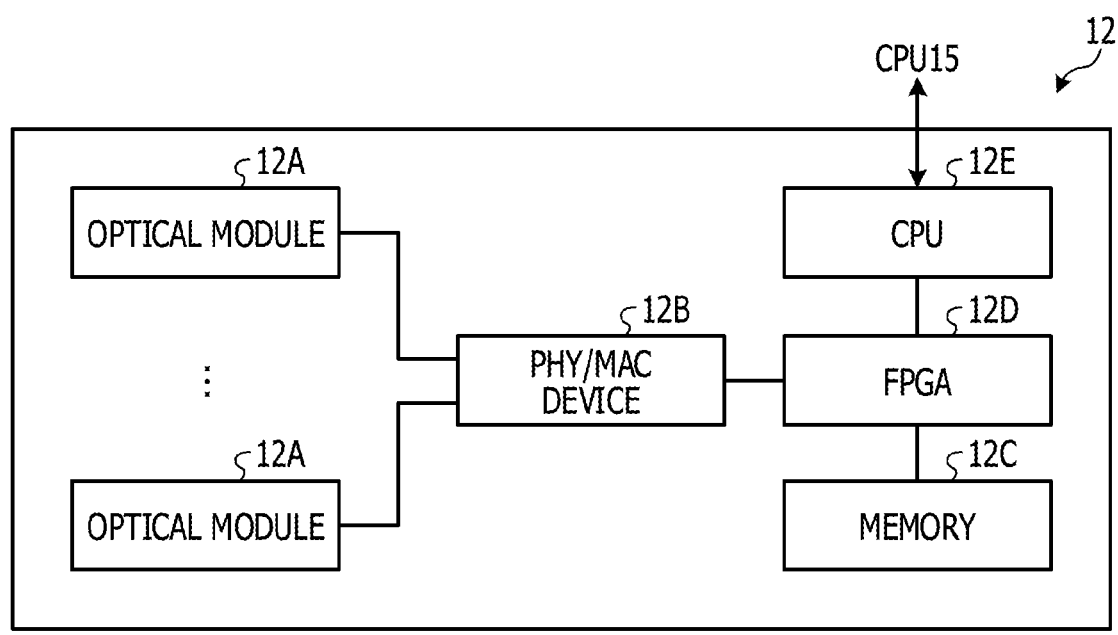
FIG. 3 is an explanatory diagram illustrating an example of a hardware configuration of a packet processor.

FIG. 3 is an explanatory diagram illustrating an example of a hardware configuration of the packet processor 12. The packet processor 12 illustrated in FIG. 3 includes a plurality of optical modules 12A, a PHY/MAC device 12B, a memory 12C, a field programmable gate array (FPGA) 12D, and a CPU 12E. The optical module 12A is a module such as a small form-factor pluggable (SFP) to execute photoelectric conversion. The PHY/MAC device 12B is a device that executes packet processing of a PHY/MAC layer. The memory 12C is a storage area to accumulate packets, for example. The FPGA 12D is a circuit that executes various kinds of packet processing such as packet analysis and QoS control. The CPU 12E controls the entire packet processor 12. The packet processor 12 may include an application specific integrated circuit (ASIC) instead of the FPGA 12D.

Figure 4:
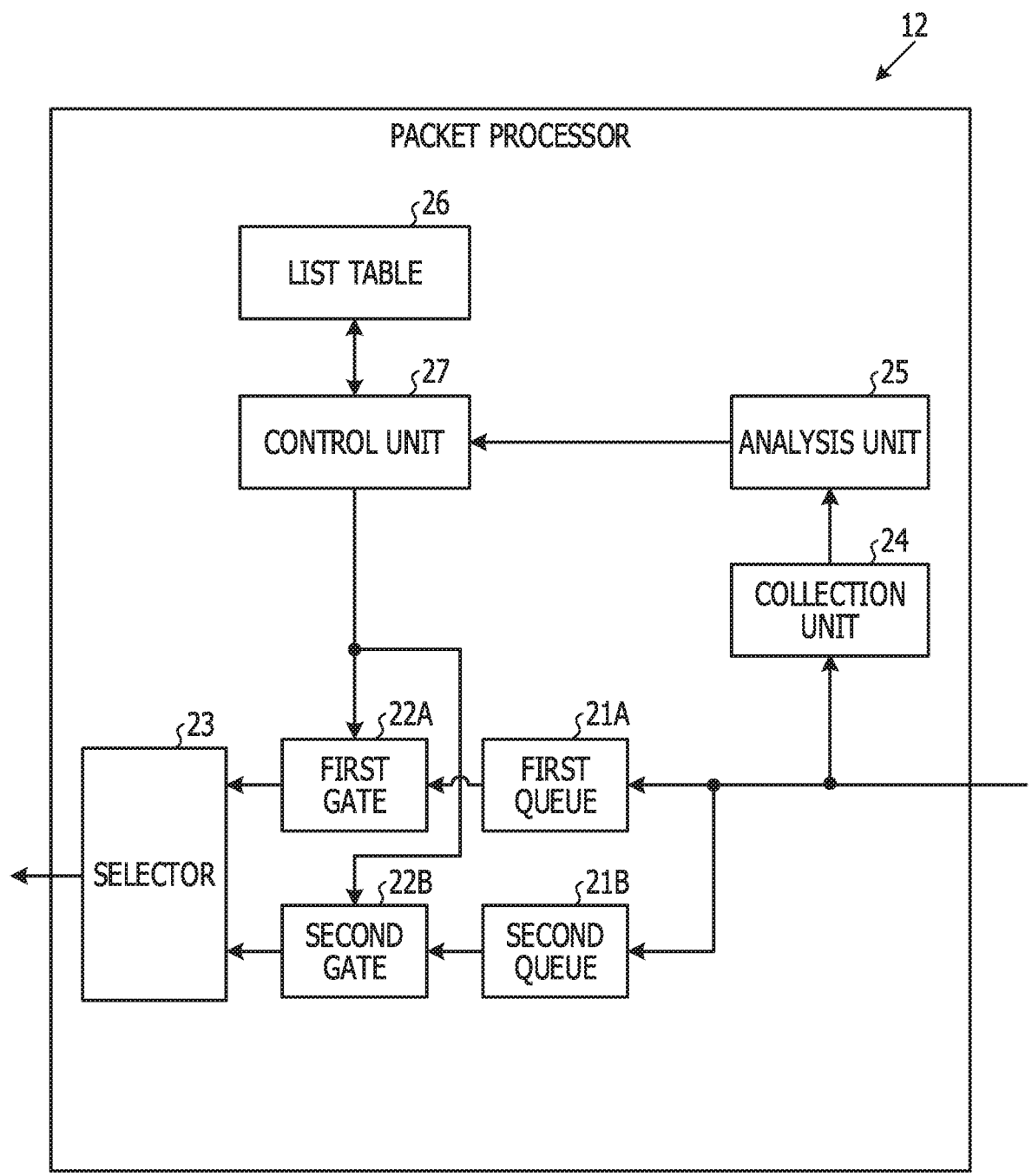
FIG. 4 is an explanatory diagram illustrating an example of a functional configuration of the packet processor.

FIG. 4 is an explanatory diagram illustrating an example of a functional configuration of the packet processor 12. The packet processor 12 illustrated in FIG. 4 includes a first queue 21A, a second queue 21B, a first gate 22A, a second gate 22B, a selector 23, a collection unit 24, an analysis unit 25, a list table 26, and a control unit 27. The first queue 21A is a storage unit for queuing MFH packets among incoming received packets. The first queue 21A identifies a P-bit of a virtual local area network (VLAN) queue 21 tag in the received packet, and queues the MFH packet when the received packet is the MFH packet, based on the identification result. The second queue 21B is a storage unit for queuing non-MFH packets, such as the MBH packets, for example, among incoming received packets. The second queue 21B identifies a P-bit of a VLAN tag in the received packet, and queues the non-MFH packet when the received packet is the non-MFH packet, based on the identification result. The MFH packet is a high-priority packet, while the non-MFH packet is a low-priority packet. As a result, the MFH packet is preferentially outputted to avoid the competition against the non-MFH packet, thus enabling suppression of MFH packet output delay. It is assumed that the first queue 21A and the second queue 21B are included in the memory 12C, for example. The first gate 22A is an opening and closing unit to open and close the output of the MFH packets in the first queue 21A. The second gate 22B is an opening and closing unit to open and close the output of the non-MFH packets in the second queue 21B. The selector 23 selects the output from the first gate 22A or the second gate 22B. It is assumed that the first gate 22A, the second gate 22B, and the selector 23 are included in the PHY/MAC device 12B, for example.

The collection unit 24 collects statistical information on received packets. The statistical information is an amount of packets received in each time slot. The amount of packets is, for example, the number of packets or the number of bytes. The analysis unit 25 analyzes the statistical information on the received packets to specify a periodicity of the received packets and a periodicity pattern such as a pattern. The analysis unit 25 estimates a true periodicity of the received packets before an operation starts, for example, and sets the estimated true periodicity as a reference. The analysis unit 25 also learns an arrival interval (periodicity) and a pattern (average arrival amount and burst fluctuation level) of the received packets during the operation, and corrects the estimated true periodicity based on a periodicity pattern obtained as a result of the learning. It is assumed that the collection unit 24 and the analysis unit 25 are included in the FPGA 12D, for example.

The control unit 27 updates table contents of the list table 26 based on analysis result of the analysis unit 25. The control unit 27 updates the time slot (TS) number in the list table 26 and the residence time for each TS number, based on the periodicity pattern of the received packets. The control unit 27 also updates the states of the first and second gates 22A and 22B set for each TS number in the list table 26, based on the periodicity pattern. The control unit 27 predicts the arrival timing of MFH packets as high-priority packets, based on the statistical information on the MFH packets among the received packets. The set states are open/closed information about the first and second gates 22A and 22B, for example, open and closed. Since the MFH packet is the high-priority packet and the non-MFH packet is the low-priority packet, the control unit 27 sets the first gate 22A in a normally open state and the second gate 22B in an open or closed state for each TS. The first gate 22A in the open state outputs the MFH packets held in the first queue 21A. The second gate 22B in the open state outputs the non-MFH packets held in the second queue 21B, and in the closed state, outputs the MFH packets held in the first queue 21A while stopping the output of the non-MFH packets held in the second queue 21B. It is assumed that the control unit 27 and the list table 26 are included in the CPU 12E, for example.

Figure 5:
FIG. 5 is an explanatory diagram illustrating an example of a table configuration of a list table.

FIG. 5 is an explanatory diagram illustrating an example of the list table 26. In the list table 26 illustrated in FIG. 5, a TS number 26A, a set state 26B of the first gate 22A, a set state 26C of the second gate 22B, and a residence time 26D are managed in association with each other. The TS number 26A is the number for identifying the time slot (TS) of the received packet. The set state 26B of the first gate 22A is gate open/closed information indicating the open (O)/closed (C) state of the first gate 22A. The set state 26C of the second gate 22B is gate open/closed information indicating the open/closed state of the second gate 22B. The residence time 26D is time allocated to the TS number 26A. The TS number 26A may be accordingly changed from 1 to N. The set state 26B of the first gate 22A and the set state 26C of the second gate 22B may also be accordingly changed for each TS number 26A. The residence time 26D may also be accordingly changed for each TS number 26A. Referring to the list table 26, the control unit 27 sets the first and second gates 22A and 22B in the set states corresponding to the TS number "1" at the timing of the TS number "1". Next, the control unit 27 sets the first and second gates 22A and 22B in the set states corresponding to the TS number "2" at the timing of the TS number "2". Then, the control unit 27 sequentially sets the first and second gates 22A and 22B in the respective set states at each timing of the TS numbers "3" to "N". Thereafter, the control unit 27 returns to the TS number "1" after setting the set states corresponding to the TS number "N" to set the set states corresponding to the TS number "1", and then sequentially sets the set states at each timing of the TS numbers "2" to "N". For example, referring to the list table 26, the control unit 27 sequentially sets the first and second gates 22A and 22B in the set states in a periodic and repetitive manner at each timing of the TS numbers "1" to "N". Focusing on the nature that bursty traffic occurs at sub-frame intervals of a radio section, the packet switch 7 identifies the MFH packet and the non-MFH packet, learns the arrival pattern (periodicity) of the MFH packet, and executes gate control based on the result of the learning.

The packet switch 7 adopts an autonomous TAS method to realize gate control by learning a periodicity pattern of autonomously arriving packets. The packet switch 7 estimates a true periodicity of packets arriving before operating the autonomous TAS method, and starts operation processing to be performed in a TSN operation, based on the true periodicity. The operation processing is TSN processing for gate control of the output of arriving packets while updating the table contents of the list table 26, based on the statistical information on the arriving packets, as described above. Therefore, the packet switch 7 uses the true periodicity of the arriving packets to execute the operation processing, and thus has to quickly and accurately detect the true periodicity of the arriving packets before starting the operation processing. However, upon detection of the true periodicity of the MFH packets, for example, packets arrive in various minute fluctuation patterns depending on the location of the RRH 5, the network configuration, the number of the radio terminals 4, and an increase or decrease in communication traffic of the wireless terminals 4. Therefore, it is difficult to quickly and accurately detect the true periodicity of the MFH packets. A sampling target for estimation of the true periodicity of the MFH packets is a discrete event such as a packet arrival process, rather than consecutive analog signals such as sound waves. Consequently, when the sampling granularity gets finer, not only the sampling operation but also load required for arithmetic processing is increased.

The processing of detecting the true periodicity of the arriving packets requires quickness in quickly detecting the true periodicity, accuracy in accurately detecting the true periodicity, and lightness in reducing the processing load upon detection of the true periodicity. Therefore, as a method for detecting periodicities of various signal patterns, there is folding analysis processing excellent in accuracy and lightness.

Figure 6:
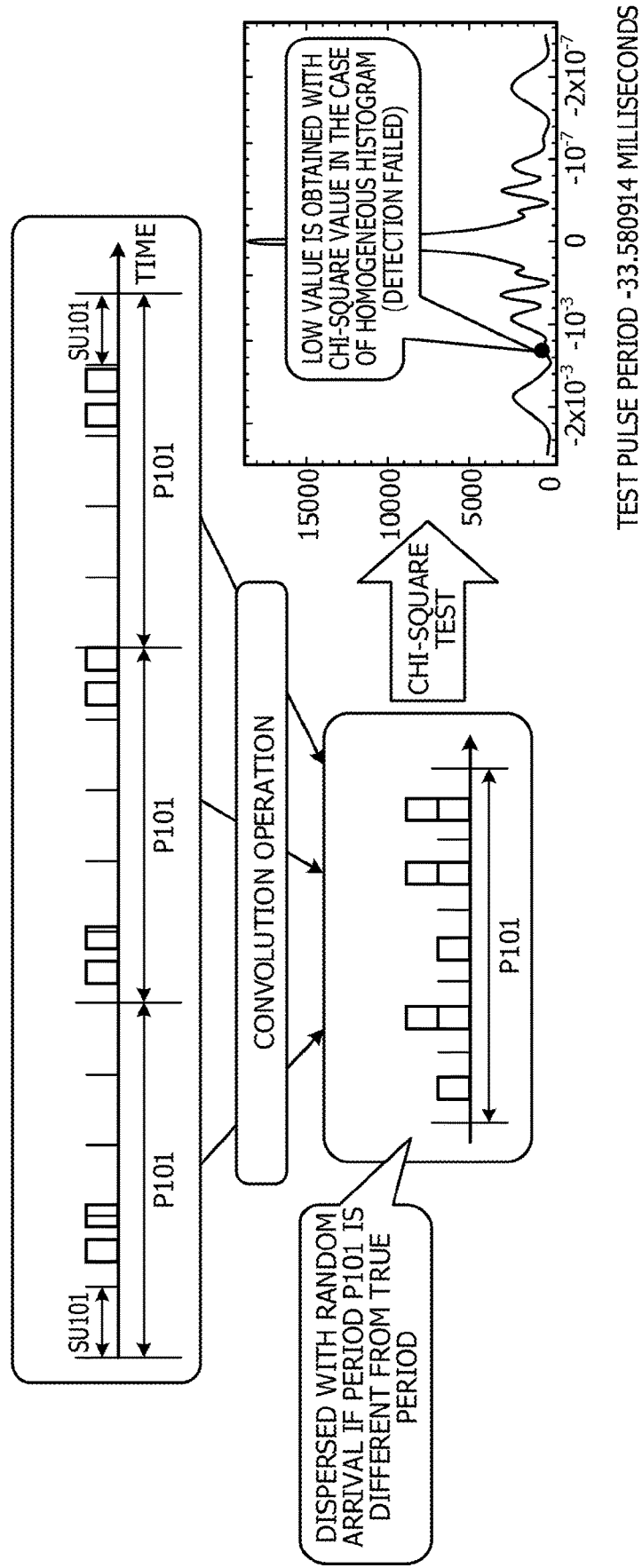
FIG. 6 is an explanatory diagram illustrating an example of the principles of folding analysis (periodicity detection failed)

The folding analysis is a method for detecting the periodicity of X-ray photons arriving from an astronomical pulsar, for example. The pulsar is the name of a neutron star that periodically and repeatedly blinks by its own rotation. Because of its fixed rotation period, the neutron star is seen as blinking with a fixed period from the earth. FIG. 6 is an explanatory diagram illustrating an example of the principles of the folding analysis (periodicity detection failed). The number of X-ray photons arriving according to the blinking of the pulsar is counted in chronological order within an observation time. For example, the number of X-ray photons collected in chronological order is sorted into a temporary period P101 including sampling section lengths (hereinafter simply referred to as the section lengths) SU 101. Then, a convolution operation is performed for the number of X-ray photons for each section length SU 101 within the temporary period P101. In the example of FIG. 6, since the X-ray photons randomly arrive in each section length SU 101 within the temporary period P101, it may be determined that the temporary period P101 is not the true period. For example, it may be determined that the periodicity detection has failed. Even when a chi-square test is conducted on the result of the convolution operation for the number of X-ray photons in the temporary period P101, a chi-square value for the temporary period P101 is also a small value in the example of FIG. 6. Thus, the chi-square value may be used to determine that the temporary period P101 is not the true period. For example, it may be determined that the periodicity detection has failed. The chi-square value is a statistical value obtained by quantifying a bias in the number of X-ray photons for each section length SU 101.

Figure 7:
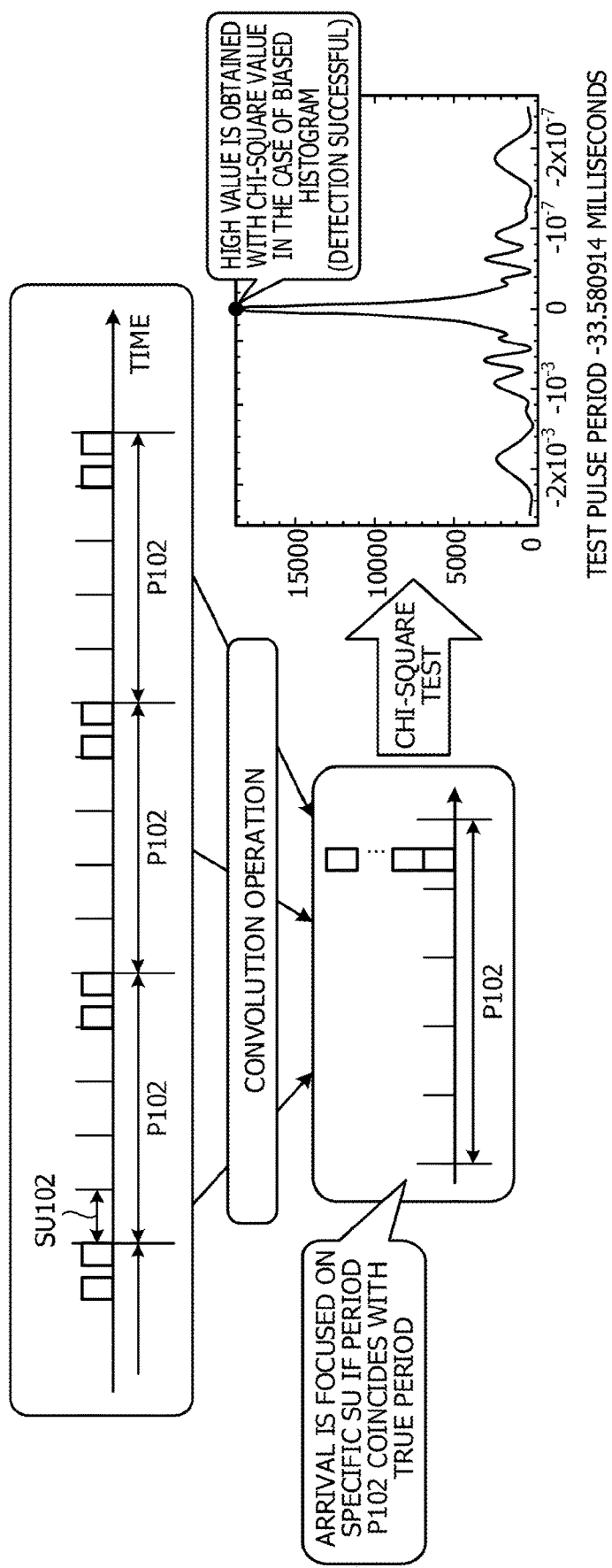
FIG. 7 is an explanatory diagram illustrating an example of the principles of folding analysis (periodicity detection successful)

FIG. 7 is an explanatory diagram illustrating an example of the principles of folding analysis (periodicity detection successful). The number of X-ray photons collected in chronological order is sorted into a temporary period P102 including section lengths SU 102 different from the section lengths SU 101. Then, a convolution operation is performed for the number of X-ray photons for each section length SU 102 within the temporary period P102. In the example of FIG. 7, since the X-ray photons collectively arrive in a specific section length SU 102 within the temporary period P102, it may be determined that the temporary period P102 is the true period. For example, it may be determined that the periodicity detection has been successful. When a chi-square test is conducted on the result of the convolution operation for the temporary period P102, a chi-square value for the temporary period P102 is a large value close to a peak value. Thus, the chi-square value may be used to determine that the temporary period P102 is the true period. For example, it may be determined that the periodicity detection has been successful.

Figure 8:
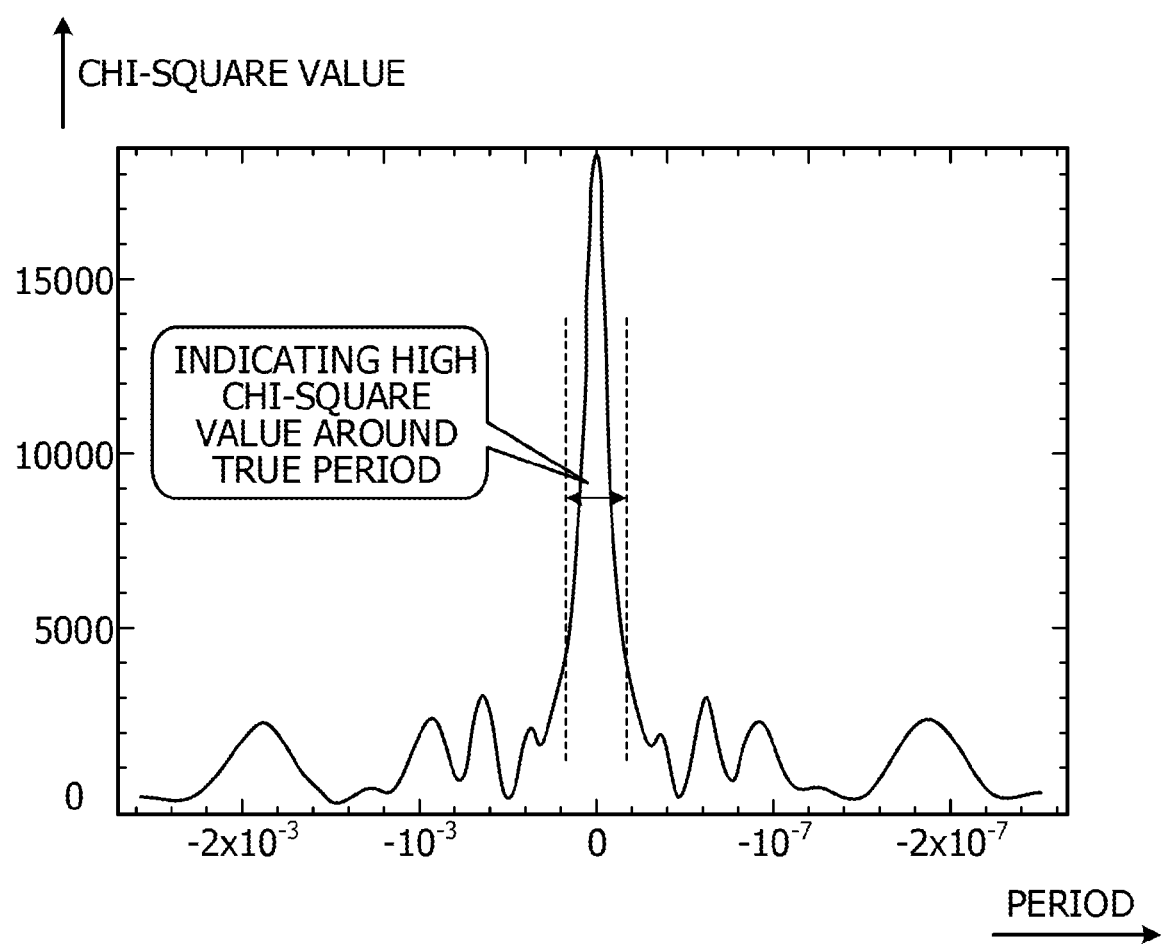
FIG. 8 is an explanatory diagram illustrating a relationship between a chi-square value and a period of arrival X-ray photons obtained by the folding analysis.

FIG. 8 is an explanatory diagram illustrating a relationship between a chi-square value and a period of arrival X-ray photons obtained by the folding analysis. As for the chi-square value illustrated in FIG. 8, a temporary period corresponding to the maximum chi-square value is a true period. However, even if the temporary period is not the true period, the chi-square value takes a high value in the neighborhood of the true period. Therefore, focusing on the characteristic that the chi-square value takes a high value, the true period of the X-ray photons may be estimated. However, while the folding analysis is excellent in accuracy upon detection of the periodicity of the X-ray photons from the pulsar, the detection of the periodicity of packets requires quickness and lightness. Therefore, the analysis unit 25 adopting analysis processing excellent in quickness and lightness is desirable.

Figure 9:
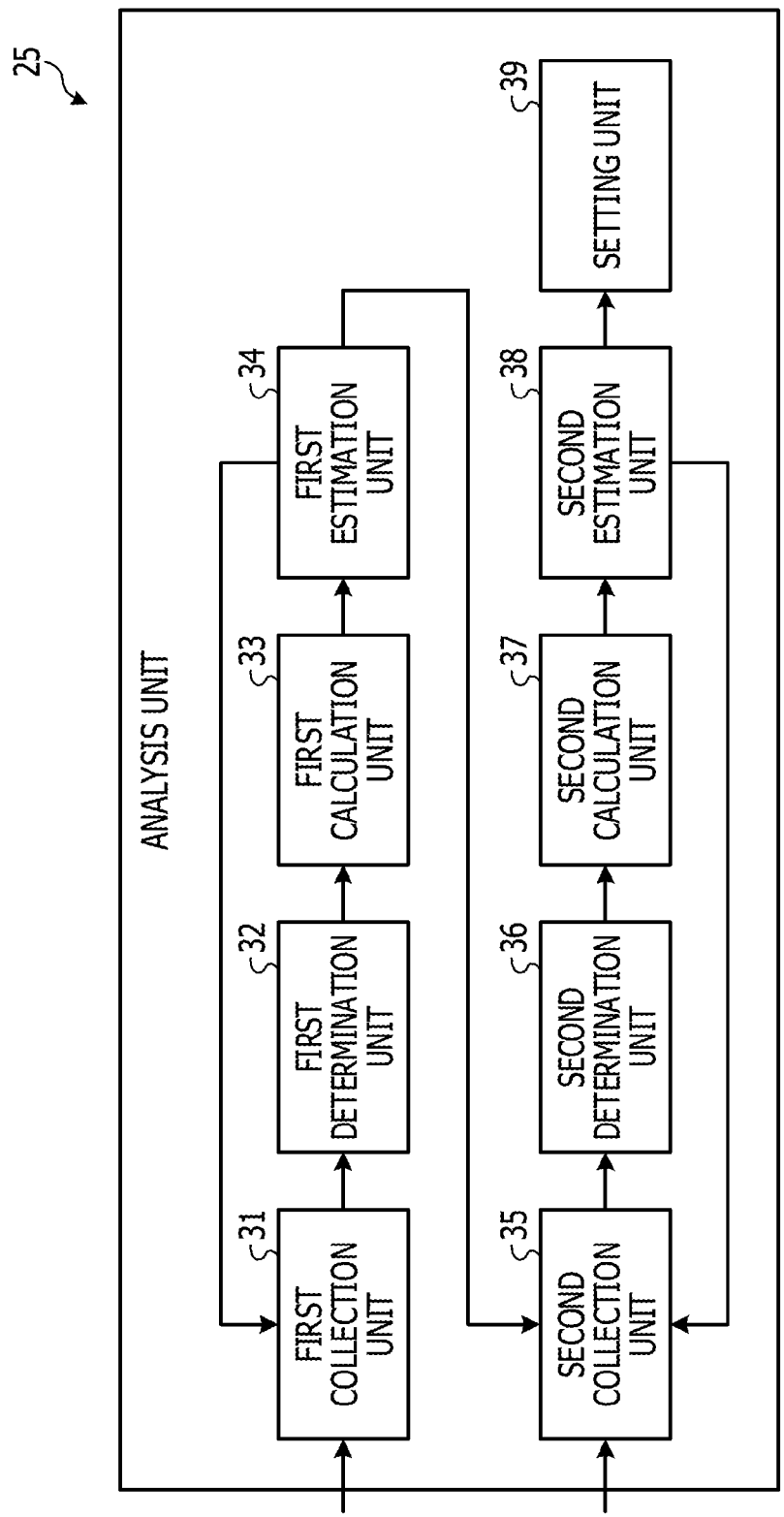
FIG. 9 is an explanatory diagram illustrating an example of a functional configuration of an analysis unit.

FIG. 9 is an explanatory diagram illustrating an example of a functional configuration of the analysis unit 25. The analysis unit 25 illustrated in FIG. 9 includes a first collection unit 31, a first determination unit 32, a first calculation unit 33, a first estimation unit 34, a second collection unit 35, a second determination unit 36, a second calculation unit 37, a second estimation unit 38, and a setting unit 39.

The first collection unit 31 collects the number of arrival packets for a first sampling frequency as a first sampling value for each first section length SU1, based on the arriving packets collected by the collection unit 24. The first section length SU1 is set so as not to be too short to ensure the lightness. The first sampling frequency is a sampling frequency for (nmax×X) intervals when the first section length is SU1, the maximum period to be examined is Pmax (SU1×nmax), and a convolution sampling frequency is X. The sampling value is the number of packets, but may be accordingly changed to the number of bytes.

The first determination unit 32 determines a plurality of temporary periods corresponding to a multiple of the first section length SU1. The first calculation unit 33 calculates a chi-square value of the first sampling value for each temporary period, based on the convolution operation and the chi-square test on the first sampling value sorted for each temporary period. In the case of a temporary period P3 with n=3, 3×X sampling values are used to execute a convolution operation and a chi-square test. The first calculation unit 33 calculates chi-square values for all the temporary periods. The first estimation unit 34 estimates a temporary period of the maximum chi-square value as a neighborhood period among the chi-square values calculated for each temporary period.

The second collection unit 35 collects the number of arrival packets for a second sampling frequency as a second sampling value for each second section length SU2 different from the first section length SU1. The second section length SU2 is different from the first section length SU1 and slightly longer than the first section length SU1, for example. As for the second section length, a period longer than the neighborhood period is set so that temporary periods around the neighborhood period are to be examined. The second determination unit 36 determines a plurality of neighborhood temporary periods, which correspond to a multiple of the second section length SU2 and are the temporary periods around the neighborhood period. For example, considering that a true period is included in the temporary periods around the neighborhood period, the second determination unit 36 focuses its examination on the neighborhood temporary period. The second calculation unit 37 calculates a chi-square value of the second sampling value for each neighborhood temporary period, based on a chi-square test on the second sampling value sorted for each neighborhood temporary period. The second estimation unit 38 estimates a neighborhood temporary period of the maximum chi-square value as a true period of the arrival packets among the chi-square values calculated for each neighborhood temporary period.

A very small difference between the first section length SU1 of the first collection unit 31 and the second section length SU2 of the second collection unit 35 may be used to perform detailed examination of the neighborhood temporary period around the neighborhood period. Thus, reduction in processing load for the sampling operation may be secured.

The first calculation unit 33 calculates a chi-square value of the first sampling value for each temporary period, based on the chi-square test on the first sampling value sorted for each temporary period, after collecting all the first sampling values by the first collection unit 31. The first estimation unit 34 estimates a temporary period of the maximum chi-square value which exceeds a neighborhood threshold that is a first threshold, among the chi-square values calculated for each temporary period, as the neighborhood period. The neighborhood threshold is a value that enables the estimation of the neighborhood period with a high probability obtained using the previous empirical rules in the event of successful period detection and period detection failure, for example. The second estimation unit 38 estimates a neighborhood temporary period of the maximum chi-square value which exceeds a true threshold that is a second threshold, among the chi-square values calculated for each neighborhood temporary period, as a true period. The true threshold is a value that enables the estimation of the true period or a period approximated thereto with a high probability obtained using the previous empirical rules in the event of successful period detection and period detection failure, for example. The true threshold is a chi-square value within a correctable error, since an error of the true period estimated in the operation processing is learned and corrected. The setting unit 39 sets the estimated true period in the control unit 27. As a result, since the true period of arriving packets is set, the control unit 27 may correct a very small period error based on the true period in the operation processing.

Figure 10:
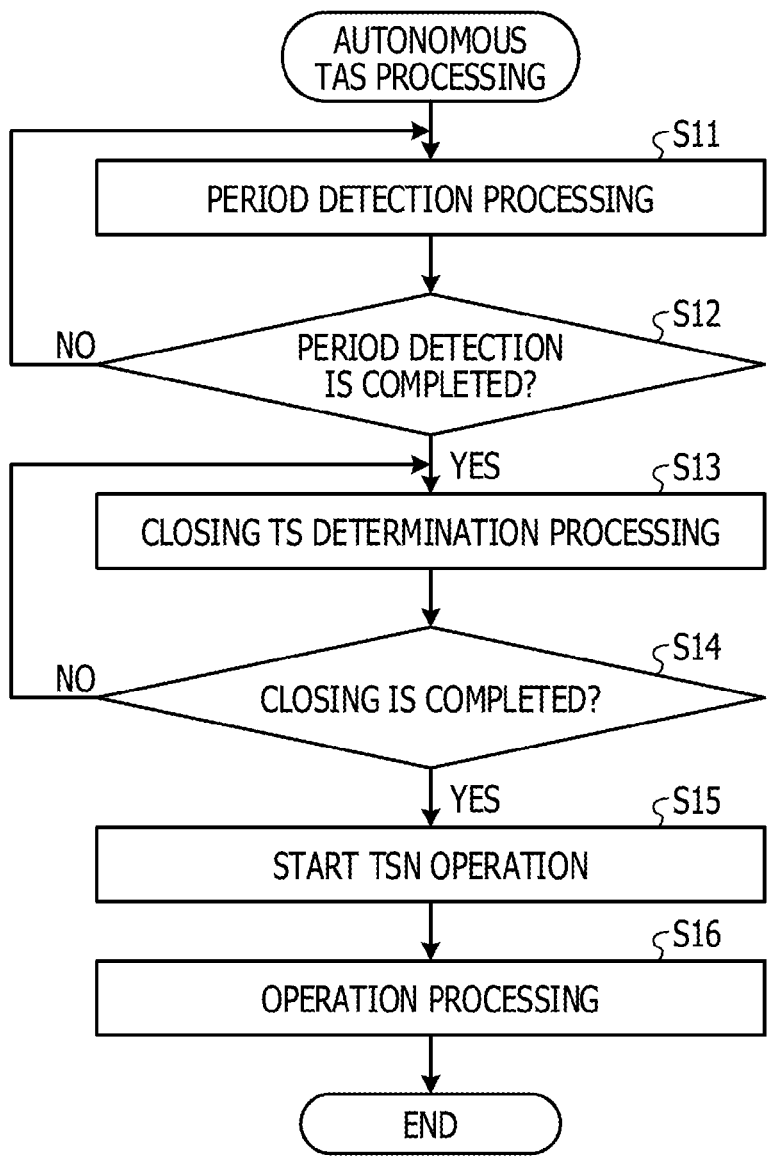
FIG. 10 is a flowchart illustrating an example of processing operations of the packet switch related to autonomous TAS processing.

Next, description is given of operations of the communication system 1 according to Embodiment 1. FIG. 10 is a flowchart illustrating an example of processing operations of the packet switch 7 related to autonomous TAS processing. In FIG. 10, the analysis unit 25 in the packet switch 7 executes period detection processing (S11). The period detection processing is a learning period in a state where TSN is yet to be implemented. The analysis unit 25 determines whether or not period detection of estimating a true periodicity of arrival packets is completed (S12). The arrival packets are MFH packets or the like, for example. When the period detection is completed (Yes in S12), the control unit 27 executes closing TS determination processing (S13). The closing TS determination processing is also a learning period in a state where TSN is yet to be implemented. The control unit 27 determines whether or not the closing is completed (S14).

When the closing is completed (Yes in S14), the control unit 27 starts a TSN operation (S15). The control unit 27 executes operation processing (S16) and terminates the processing operations illustrated in FIG. 10. The operation processing is processing of executing the TSN operation.

In the autonomous TAS processing, after the estimation of the true periodicity of the MFH packets by the period detection processing, the operation processing is executed by starting the TSN operation based on the true periodicity. As a result, the packet switch 7 executes gate control of the packets based on the estimated true periodicity of the MFH packets. Thus, output delay of the MFH packets may be suppressed.

Figure 11:
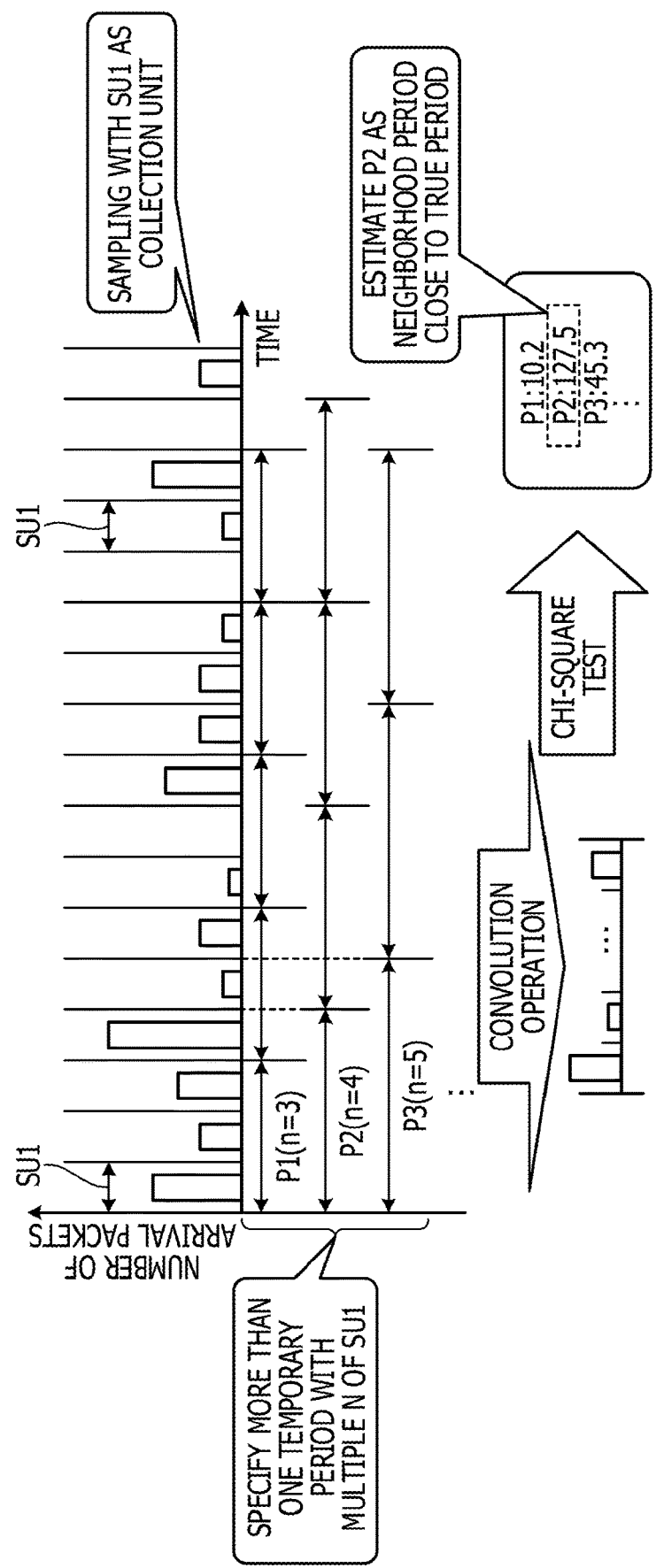
FIG. 11 is an explanatory diagram illustrating an example of operations related to estimation of a neighborhood period of arrival packets.

FIG. 11 is an explanatory diagram illustrating an example of operations related to estimation of a neighborhood period of arrival packets. The first collection unit 31 in the analysis unit 25 sequentially collects the number of arrival packets for the first sampling frequency for each first section length SU1, as a first sampling value. The first determination unit 32 determines a plurality of temporary periods, for example, temporary periods P1, P2, and P3, with a multiple n of the first section length SU1. For example, in the temporary period P1 illustrated in FIG. 11, three first section lengths SU1 make up one period. In the temporary period P2, four first section lengths SU1 make up one period. In the temporary period P3, five first section lengths SU1 make up one period.

The first calculation unit 33 sequentially executes convolution operations of the number of arrival packets for each temporary period. The first calculation unit 33 executes a convolution operation of the number of arrival packets for each first section length SU1 in the temporary period P1. The first calculation unit 33 also executes a convolution operation of the number of arrival packets for each first section length SU1 in the temporary period P2, for example. The first calculation unit 33 further executes a convolution operation of the number of arrival packets for each first section length SU1 in the temporary period P3, for example. Then, the first calculation unit 33 conducts a chi-square test on the convolution operation value for each temporary period to calculate a chi-square value for each temporary period. The chi-square value for the temporary period P1 is, for example, 10.2, the chi-square value for the temporary period P2 is, for example, 127.5, and the chi-square value for the temporary period P3 is, for example, 45.3.

The first estimation unit 34 estimates the temporary period with the maximum chi-square value, among the chi-square values for each temporary period, as a neighborhood period. As a result, since the maximum chi-square value is "127.5" in the case of the example illustrated in FIG. 11, the first estimation unit 34 estimates the temporary period P2 corresponding to the chi-square value as the neighborhood period.

Figure 12:
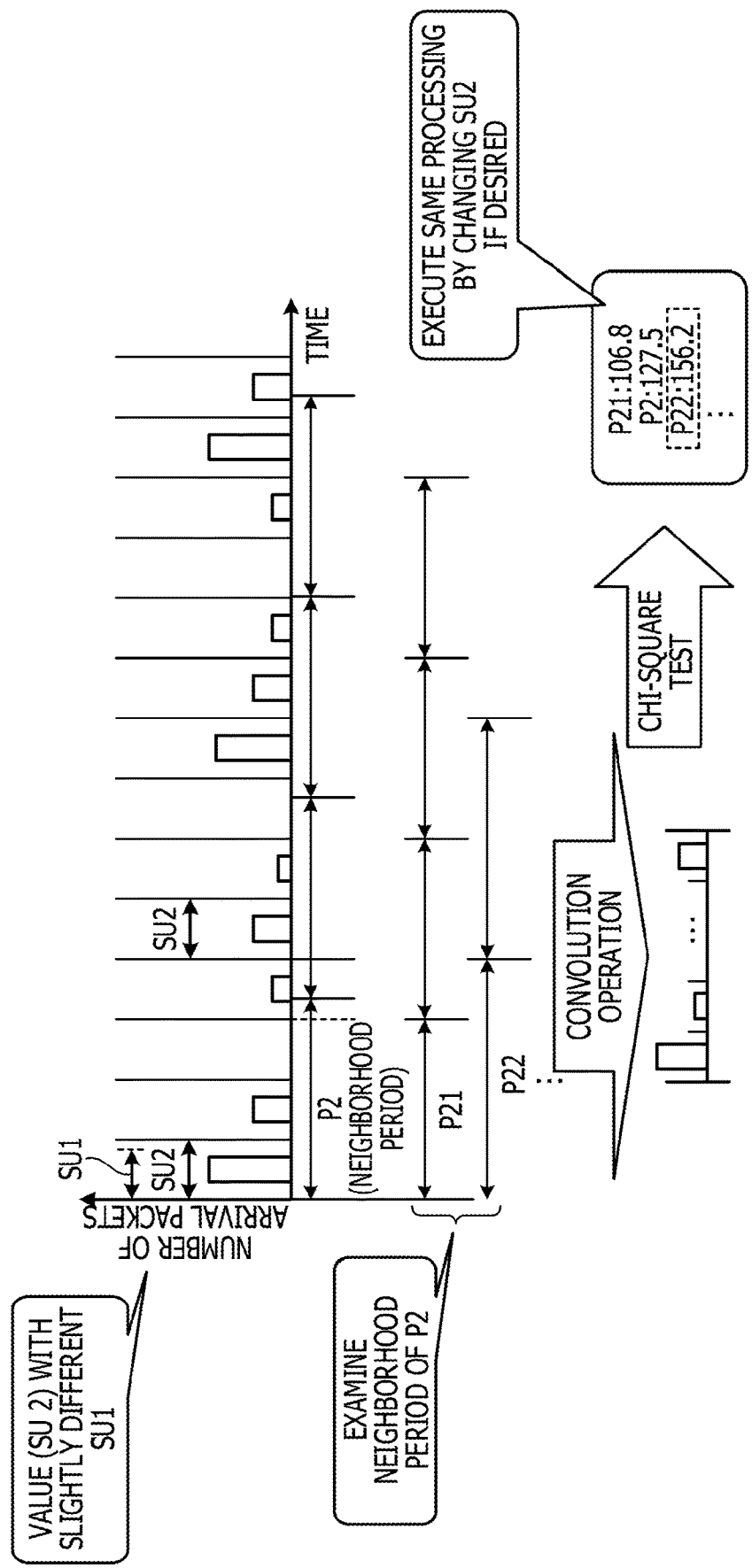
FIG. 12 is an explanatory diagram illustrating an example of operations related to estimation of a true period of arrival packets.

FIG. 12 is an explanatory diagram illustrating an example of operations related to estimation of a true period of arrival packets. The second collection unit 35 sequentially collects the number of arrival packets for the second sampling frequency for each second section length SU2 different from the first section length SU1, as a second sampling value. The second determination unit 36 determines a plurality of neighborhood temporary periods around the neighborhood period P2 estimated by the first estimation unit 34, with a multiple of the second section length SU2. In the case of the example illustrated in FIG. 12, the second determination unit 36 determines a neighborhood temporary period P21 and a neighborhood temporary period P22. In the neighborhood temporary period P21, three second section lengths SU2, for example, make up one period. In the neighborhood temporary period P22, four second section lengths SU2, for example, make up one period.

The second calculation unit 37 executes convolution operations of the number of arrival packets in each of the second section lengths SU2 for each neighborhood temporary period. The second calculation unit 37 executes a convolution operation of the number of arrival packets for each second section length SU2 in the neighborhood temporary period P21. The second calculation unit 37 also executes a convolution operation of the number of arrival packets for each second section length SU2 in the neighborhood temporary period P22. Then, the second calculation unit 37 conducts a chi-square test on the convolution operation result for each neighborhood temporary period to calculate a chi-square value for each neighborhood temporary period. The chi-square value for the neighborhood temporary period P21 is, for example, 106.8, and the chi-square value for the neighborhood temporary period P22 is, for example, 156.2. The second estimation unit 38 estimates the temporary period with the maximum chi-square value, which exceeds a true threshold, among the chi-square values for each neighborhood temporary period, as a true period. As a result, in the case of the example illustrated in FIG. 12, the second estimation unit 38 estimates the neighborhood temporary period P22 corresponding to the chi-square value "156.2" as the true period.

When the first collection unit 31 collects samples for 100 periods assuming that the temporary period P is 1 m second, for example, the sample collection requires 1 m second× 100=100 m seconds. The same goes for the second collection unit 35. Meanwhile, since the arithmetic processing such as the convolution operation and the chi-square test for each temporary period is simple processing, it takes $\frac{1}{100}$ m seconds or less, for example, for the first calculation unit 33 to perform the arithmetic processing. The same goes for the second calculation unit 37. The first collection unit 31 determines a plurality of temporary periods with a multiple of the section length after determining the section length, rather than determining the temporary period and then executing the sampling operation of the arrival packets for each temporary period. The first collection unit 31 executes the sampling operation of the section length only once. As a result, the first calculation unit 33 uses the sampling value obtained by the one sampling operation for all the temporary periods. Thus, the sampling time that takes to estimate the neighborhood period may be significantly shortened, and the quickness may be ensured. Likewise, the second collection unit 35 uses the sampling value obtained by the one sampling operation for all the neighborhood temporary periods. Thus, the sampling time that takes to estimate the true period may be significantly shortened, and the quickness may be ensured.

Figure 13A:
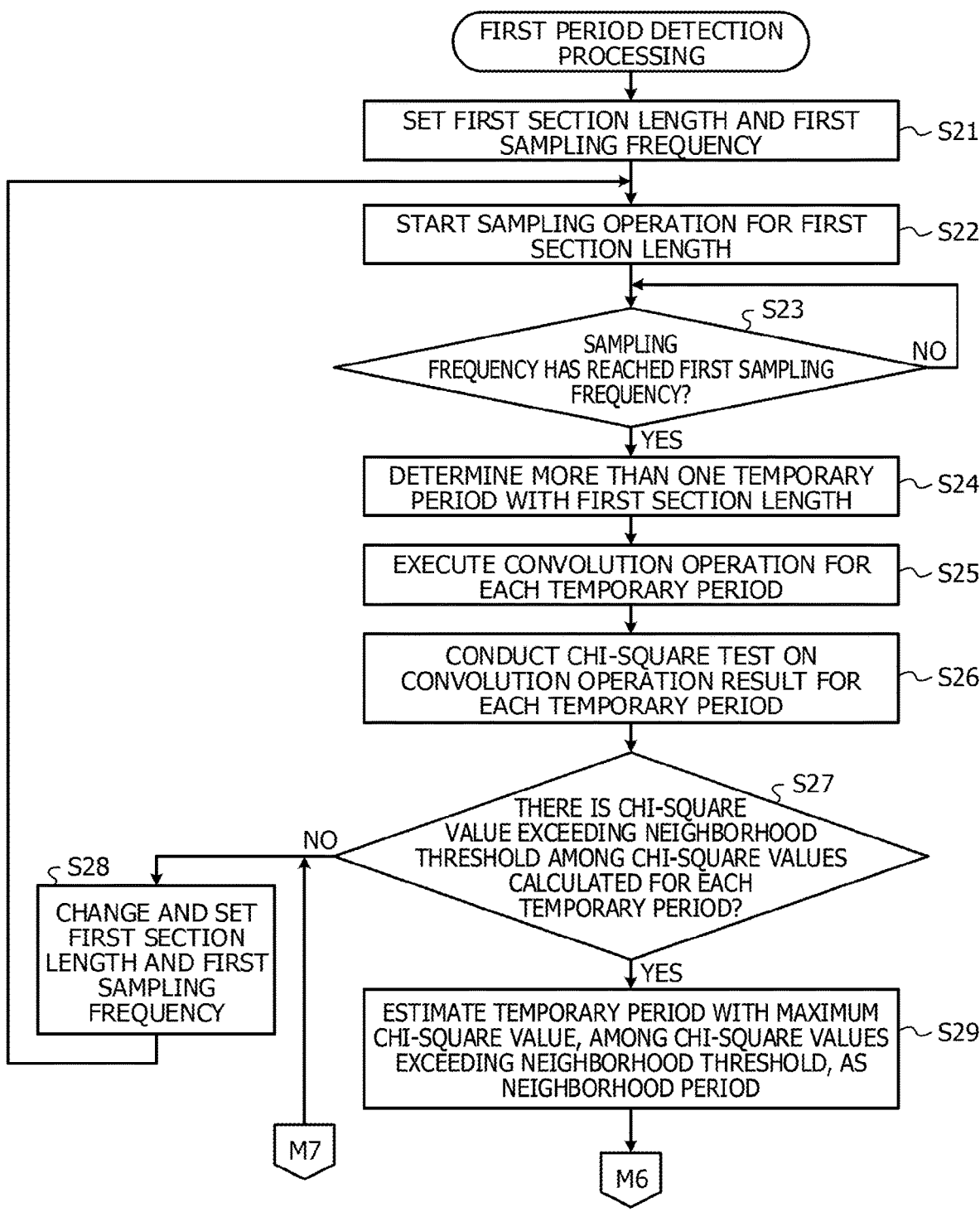
FIGS. 13A and 13B are flowcharts each illustrating an example of processing operations of the analysis unit related to first period detection processing.
Figure 13B:
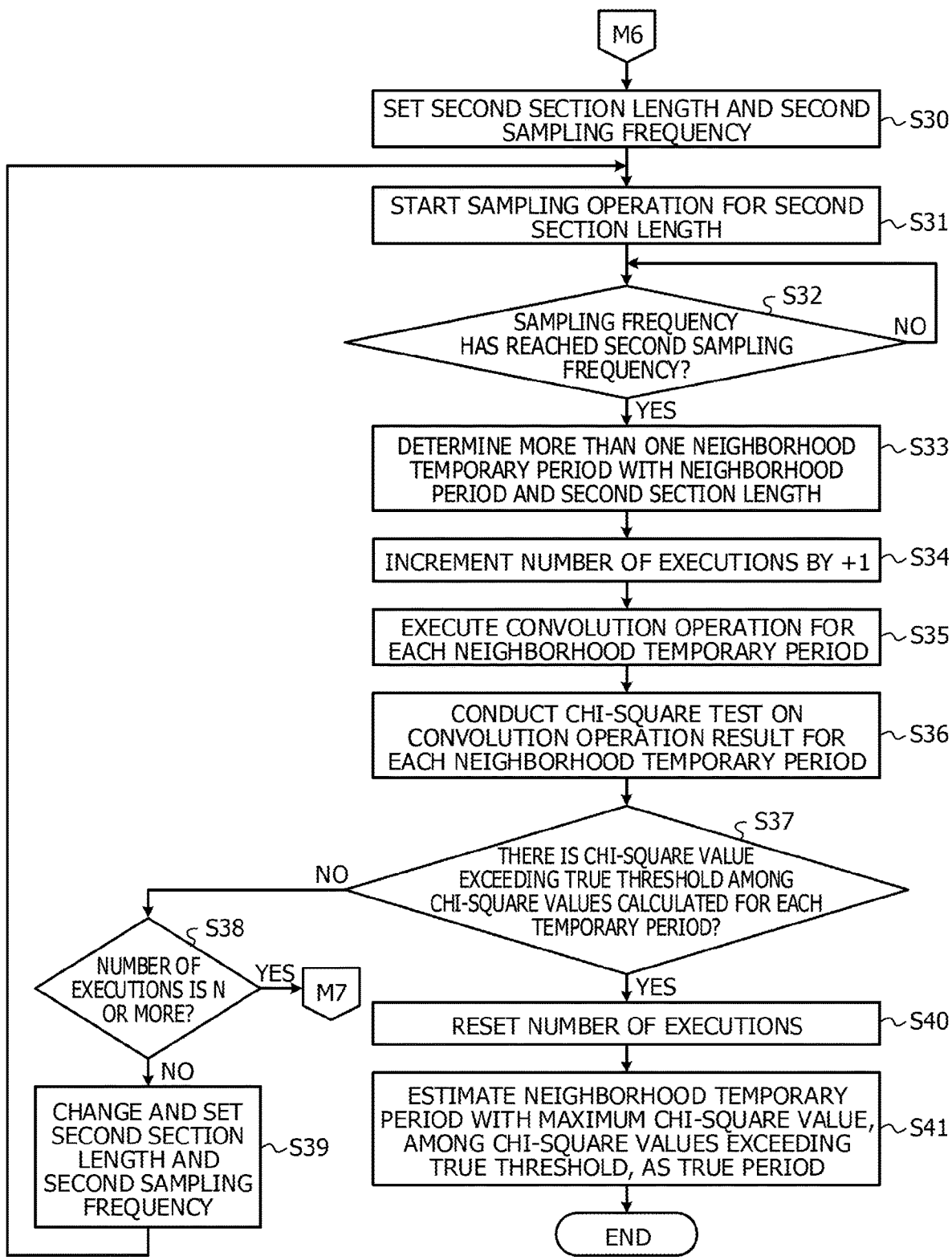

FIGS. 13A and 13B are flowcharts illustrating an example of processing operations of the analysis unit 25 related to first period detection processing. In FIG. 13A, the first collection unit 31 in the analysis unit 25 sets a first section length and a first sampling frequency (S21). The first sampling frequency is a sampling amount sufficient to calculate a chi-square value for each temporary period, which is calculated with a multiple of the first section length SU1. The first collection unit 31 starts a sampling operation for the first section length SU1, based on the first section length SU1 and the first sampling frequency (S22). The first collection unit 31 determines whether or not the sampling frequency has reached the first sampling frequency (S23).

When the sampling frequency has reached the first sampling frequency (Yes in S23), the first determination unit 32 in the analysis unit 25 determines a plurality of temporary periods with a multiple of the first section length SU1 (S24). The first calculation unit 33 in the analysis unit 25 executes a convolution operation of the first sampling value for each temporary period (S25), and sequentially calculates a chi-square value for each temporary period based on a chi-square test on the convolution operation result for each temporary period (S26).

The first estimation unit 34 in the analysis unit 25 determines whether or not the chi-square values for each temporary period include a chi-square value that exceeds a neighborhood threshold (S27). When there is no chi-square value that exceeds the neighborhood threshold (No in S27), the first collection unit 31 changes and sets the first section length SU1 and the first sampling frequency (S28) and then moves to S22 to start a sampling operation of the first section length SU1. When there is the chi-square value that exceeds the neighborhood threshold (Yes in S27), the first estimation unit 34 estimates the temporary period with the maximum chi-square value, among the chi-square values exceeding the neighborhood threshold, as a neighborhood period (S29). As a result, the first estimation unit 34 may accurately estimate the neighborhood period since the condition for the neighborhood period is that the chi-square value exceeds the neighborhood threshold.

The second collection unit 35 in the analysis unit 25 sets a second section length SU2 different from the first section length SU1 and a second sampling frequency (S30). The second sampling frequency is a sampling amount sufficient to calculate a chi-square value for each neighborhood temporary period, which is calculated with a multiple of the second section length SU2. The second collection unit 35 starts a sampling operation for the second section length SU2, based on the second section length SU2 and the second sampling frequency (S31). The second collection unit 35 determines whether or not the sampling frequency has reached the second sampling frequency (S32). When the sampling frequency has reached the second sampling frequency (Yes in S32), the second determination unit 36 in the analysis unit 25 determines a plurality of neighborhood temporary periods around the neighborhood period with a multiple of the second section length SU2 (S33).

The second calculation unit 37 in the analysis unit 25 increments the number of executions by +1 (S34) and executes a convolution operation of the second sampling value for each neighborhood temporary period (S35). The second calculation unit 37 also calculates a chi-square value for each neighborhood temporary period, based on a chi-square test on the convolution operation result of the second sampling value for each neighborhood temporary period (S36).

The second estimation unit 38 in the analysis unit 25 determines whether or not the chi-square values for each neighborhood temporary period include a chi-square value that exceeds a true threshold (S37). When there is no chi-square value that exceeds the true threshold (No in S37), the second estimation unit 38 determines whether or not the number of executions is N or more (S38).

When the number of executions is N or more (Yes in S38), the second collection unit 35 moves to S28 to redetermine new temporary periods and to change the first section length SU1 and the first sampling frequency. When the number of executions is not N or more (No in S38), the second collection unit 35 determines that the number of executions is less than N, and changes the second section length SU2 and the second sampling frequency to redetermine new neighborhood temporary periods (S39). Then, the second collection unit 35 moves to S31 to start a sampling operation of the second section length SU2.

When the chi-square values for each neighborhood temporary period include the chi-square value that exceeds the true threshold (Yes in S37), the second estimation unit 38 resets the number of executions (S40). Then, the second estimation unit 38 estimates the neighborhood temporary period with the maximum chi-square value, among the chi-square values exceeding the true threshold, as the true period (S41) and then terminates the processing operations illustrated in FIG. 13B. As a result, the second estimation unit 38 may accurately estimate the true period since the condition for the true period is that the chi-square value exceeds the true threshold. Then, the setting unit 39 sets the estimated true period in the control unit 27.

Once the neighborhood period around the true period is estimated, the analysis unit 25 that executes the first period detection processing may estimate a period close to the true period by performing detailed examination of the neighborhood temporary period around the neighborhood period.

Figure 14:
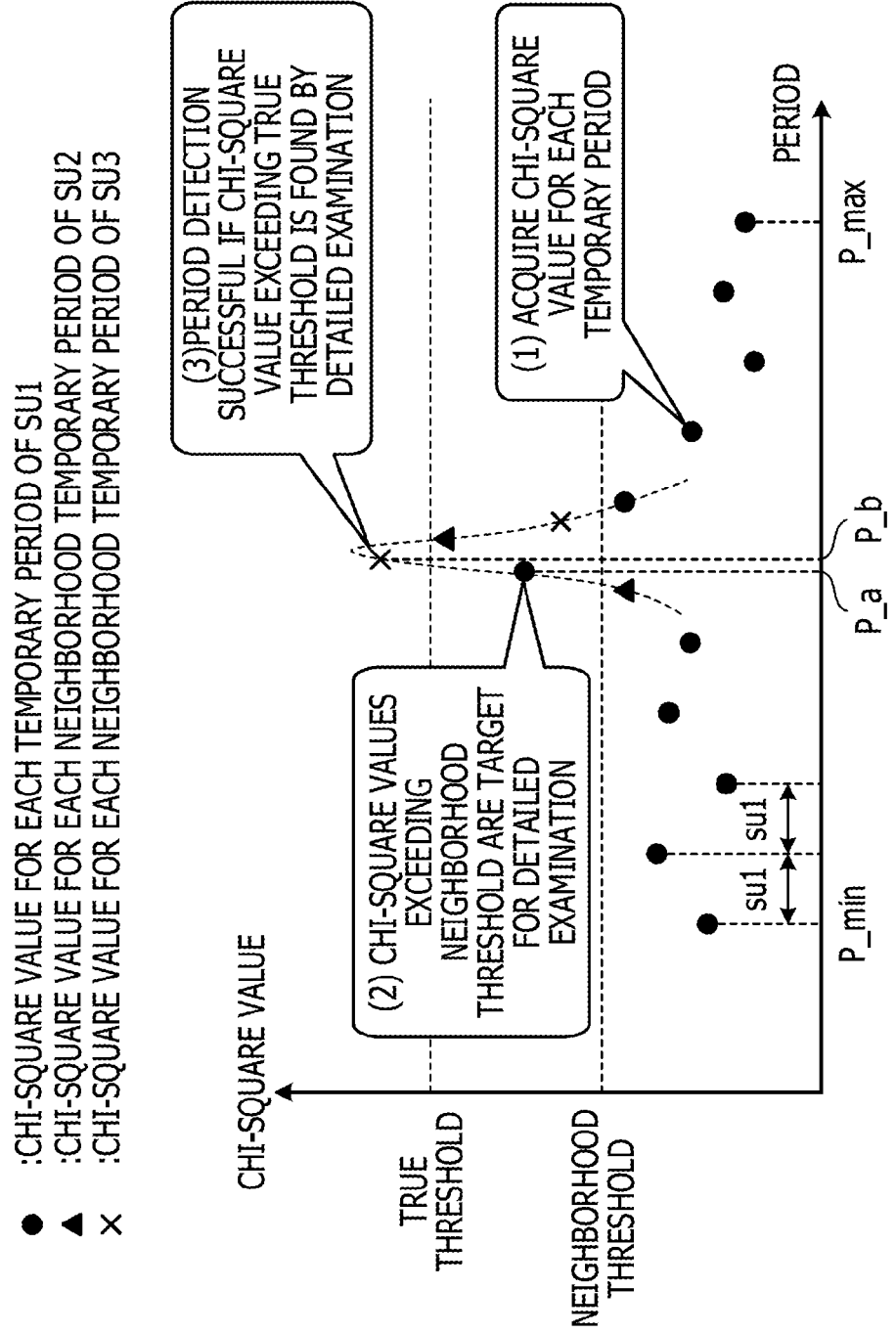
FIG. 14 is an explanatory diagram illustrating a relationship between a chi-square value and a period of arrival packets obtained by the first period detection processing.

FIG. 14 is an explanatory diagram illustrating a relationship between the chi-square value and the period of arrival packets obtained by the first period detection processing. The first calculation unit 33 sequentially calculates chi-square values (black circles illustrated in FIG. 14) for each temporary period (Pmin to Pmax) specified with a multiple of the first section length SU1. The first estimation unit 34 estimates the temporary period with the maximum chi-square value, which exceeds the neighborhood threshold, among the chi-square values for each temporary period, as a neighborhood period Pa. The second calculation unit 37 also sequentially calculates chi-square values (black triangles illustrated in FIG. 14) for each neighborhood temporary period specified with a multiple of the second section length SU2 around the neighborhood period. Since the chi-square value of the neighborhood temporary period does not exceed the true threshold, the second determination unit 36 changes the second section length SU2 to the third section length SU3. Then, the second calculation unit 37 sequentially calculates chi-square values (x illustrated in FIG. 14) for each neighborhood temporary period Pb specified with a multiple of the third section length SU3 around the neighborhood period. When the chi-square value of the neighborhood temporary period Pb of the third section length SU3 exceeds the true threshold, the second estimation unit 38 estimates the neighborhood temporary period Pb of the chi-square value exceeding the true threshold as the true period. As a result, the period detection has been successful.

The analysis unit 25 of Embodiment 1 estimates the temporary period of the chi-square value around the true period, among the chi-square values for each temporary period, as the neighborhood period in one sampling operation of the first section length SU1. The analysis unit 25 also estimates the neighborhood temporary period of the chi-square value around the true period, among the chi-square values for each neighborhood temporary period around the neighborhood period, as the true period in one sampling operation of the second section length SU2. As a result, the periodicity of arrival packets may be accurately detected while ensuring the quickness by significantly shortening the processing time required for the sampling as well as the lightness by reducing the sampling amount.

After the collection of all the sampling values for all the temporary periods in one sampling operation of the first section length SU1, the first calculation unit 33 executes arithmetic processing of the sampling values for each temporary period. As a result, the neighborhood period may be accurately estimated, since the chi-square values for all the temporary periods may be compared.

The first estimation unit 34 estimates the temporary period with the maximum chi-square value, which exceeds the neighborhood threshold, among the chi-square values calculated for each temporary period, as the neighborhood period. As a result, the neighborhood period may be accurately estimated by comparing with the neighborhood threshold.

The second estimation unit 38 estimates the neighborhood temporary period with the maximum chi-square value, which exceeds the true threshold, among the chi-square values calculated for each neighborhood temporary period, as the true period. As a result, the true period may be accurately estimated by comparing with the true threshold.

The second determination unit 36 determines the neighborhood temporary period around the neighborhood period with a multiple of the second section length SU2. As a result, the neighborhood temporary period may be easily determined.

When the neighborhood period may not be estimated with the chi-square value of the temporary period specified with a multiple of the first section length SU1, the first determination unit 32 of Embodiment 1 changes the first section length SU1 and the first sampling frequency, and determines a different temporary period with a multiple of the changed first section length SU1. However, when the neighborhood period may not be estimated, the first determination unit 32 may determine a different temporary period by changing the multiple of the first section length SU1 without changing the first section length and the first sampling frequency. Such modification may be made accordingly.

When the number of executions is not N or more, the second determination unit 36 changes the second section length SU2 and the second sampling frequency, and determines a different neighborhood temporary period with a multiple of the changed second section length SU2. However, when the number of executions is not N or more, the second determination unit 36 may determine a different neighborhood temporary period by changing the multiple of the second section length SU2 without changing the second section length SU2 and the second sampling frequency. Such modification may be made accordingly.

The second estimation unit 38 estimates the neighborhood temporary period with the maximum chi-square value, which exceeds the true threshold, among the chi-square values for each neighborhood temporary period, as the true period. However, the second estimation unit 38 may estimate the neighborhood temporary period with the maximum chi-square value as the true period, without comparing with the true threshold, among the chi-square values for each neighborhood temporary period. Such modification may be made accordingly.

The second determination unit 36 determines a plurality of neighborhood temporary periods around the neighborhood period with a multiple of the second section length SU2. However, the second determination unit 36 may determine the plurality of neighborhood temporary periods around the neighborhood period without using the second section length SU2. Such modification may be made accordingly.

When the chi-square values for each neighborhood temporary period include a chi-square value that exceeds a true threshold, the second estimation unit 38 estimates the neighborhood temporary period with the maximum chi-square value, among the chi-square values exceeding the true threshold, as the true period. However, the second estimation unit 38 may estimate any of the neighborhood temporary periods of the chi-square value exceeding the true threshold as the true period. Such modification may be made accordingly.

The first estimation unit 34 estimates the temporary period of the chi-square value exceeding the neighborhood threshold, among the chi-square values calculated for each temporary period, as the neighborhood period. However, the first estimation unit 34 may estimate the temporary period with the maximum chi-square value, among the chi-square values calculated for each temporary period, as the neighborhood period. Such modification may be made accordingly.

After the sampling frequency has reached the first sampling frequency in the first collection unit 31, the analysis unit 25 of Embodiment 1 collectively calculates the chi-square values for each temporary period with the first sampling values for the first sampling frequency. However, the embodiment is not limited thereto but any modification may be made accordingly. Therefore, such an embodiment is described below as Embodiment 2. The same configurations as those in the communication system according to Embodiment 1 are denoted by the same reference numerals, and thus repetitive description of such configurations and operations is omitted.

Embodiment 2

Figure 15A:
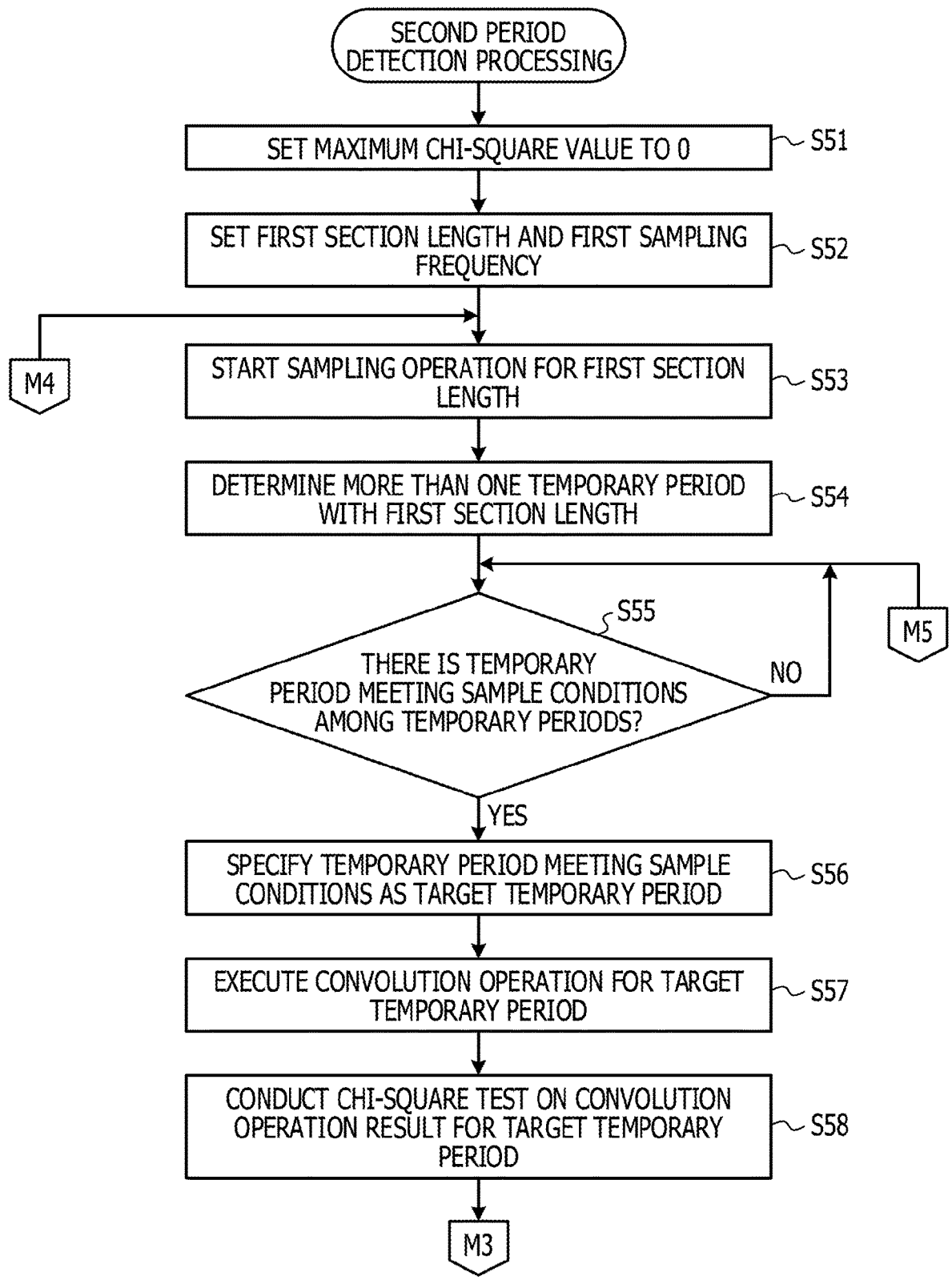
FIGS. 15A and 15B are flowcharts each illustrating an example of processing operations of the analysis unit related to second period detection processing.
Figure 15B:
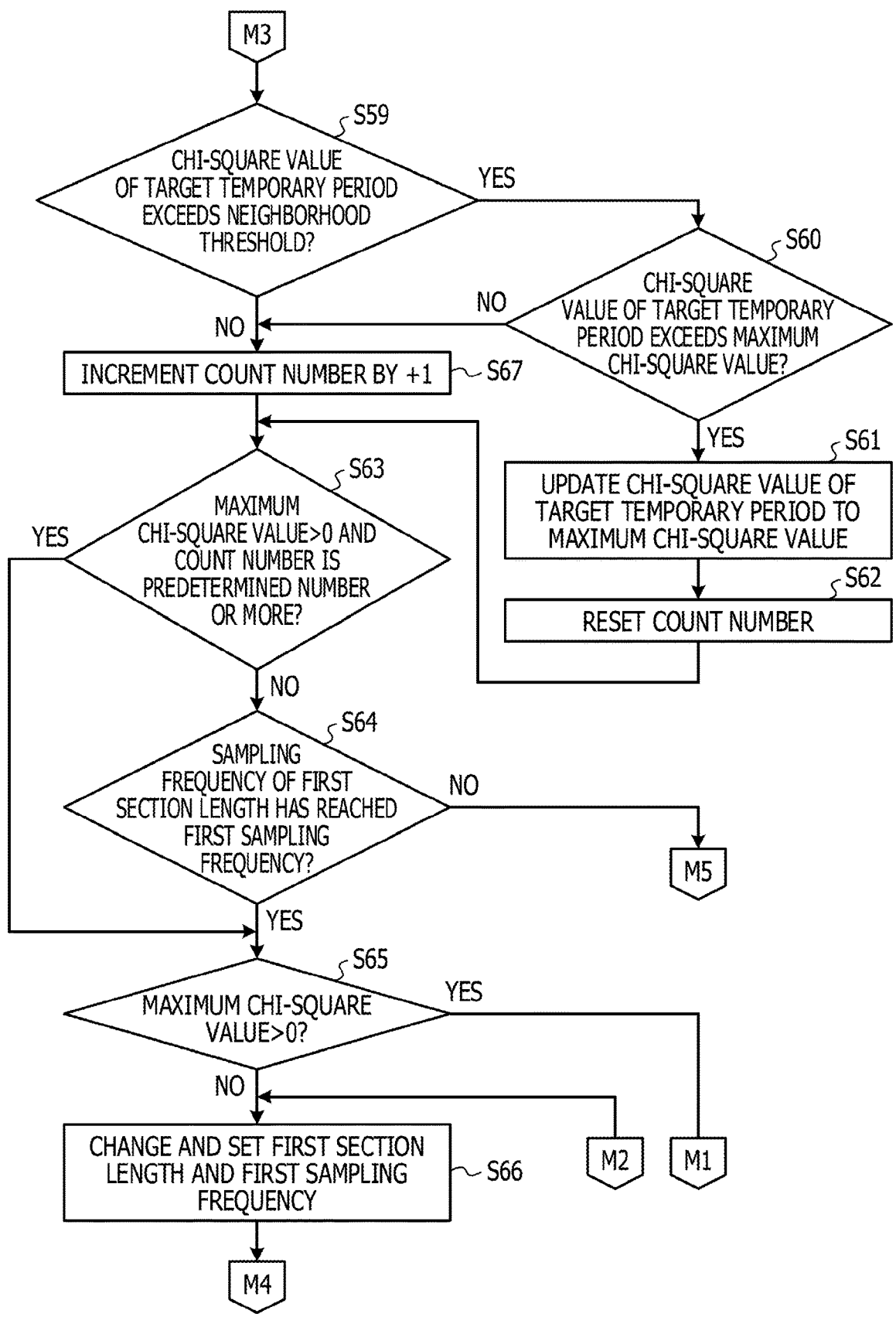
Figure 16:
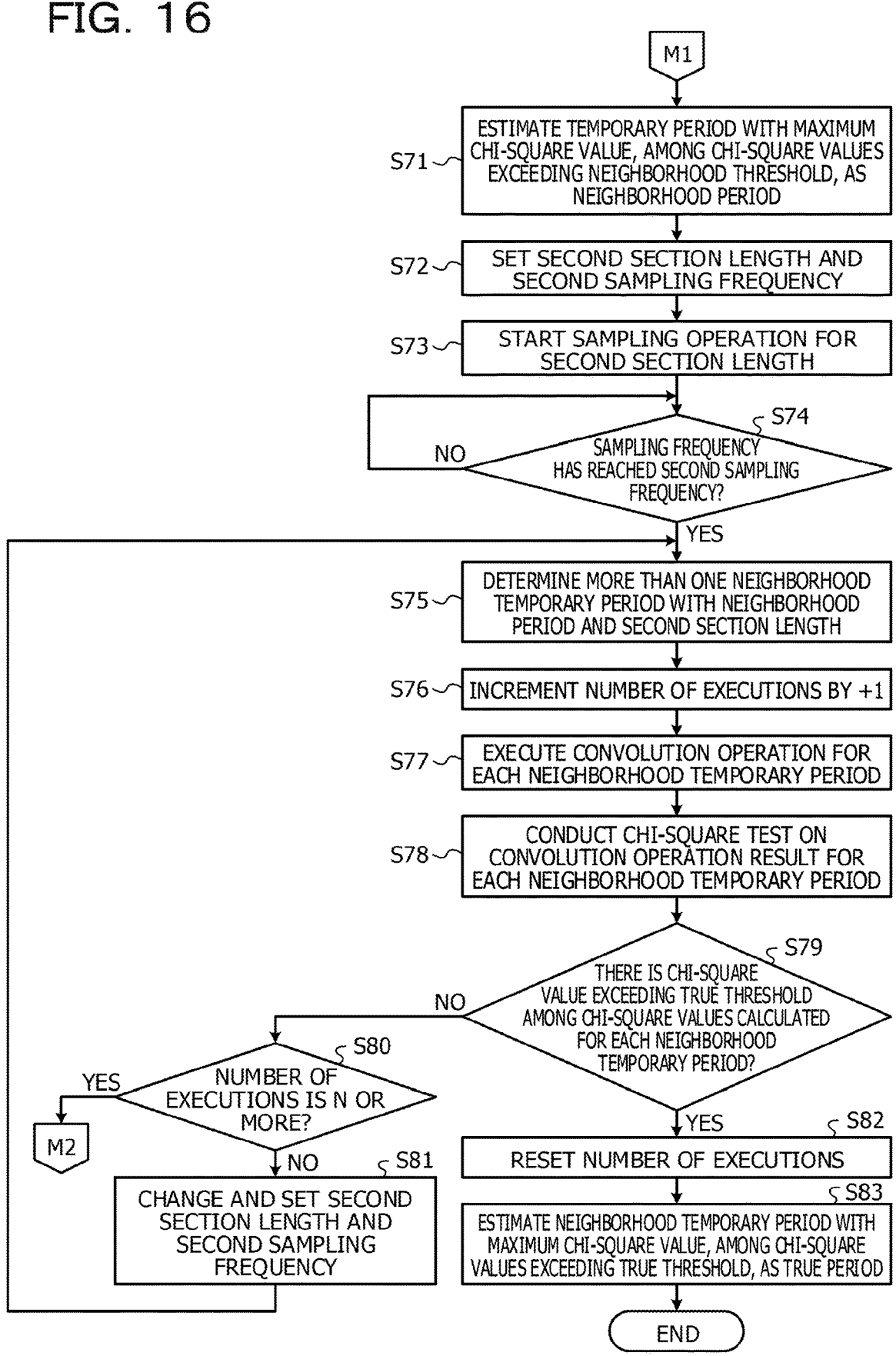
FIG. 16 is a flowchart illustrating an example of processing operations of the analysis unit related to second period detection processing.

FIGS. 15A, 15B and 16 are flowcharts each illustrating an example of processing operations of the analysis unit 25 related to second period detection processing. In FIG. 15A, the first collection unit 31 in the analysis unit 25 sets the maximum chi-square value to 0 (S51) and sets a first section length SU1 and a first sampling frequency (S52). The first collection unit 31 starts a sampling operation of the first section length SU1 (S53). The first determination unit 32 determines a plurality of temporary periods with a multiple of the first section length SU1 (S54).

The first calculation unit 33 determines whether or not the plurality of temporary periods include a temporary period that meets sample conditions (S55). The temporary period that meets the sample conditions is a temporary period that has reached a sampling frequency which enables a convolution operation and a chi-square test. When there is the temporary period that meets the sample conditions (Yes in S55), the first calculation unit 33 specifies the temporary period that meets the sample conditions as a target temporary period (S56).

The first calculation unit 33 executes a convolution operation of the specified target temporary period (S57) and executes a chi-square test on the convolution operation result for the target temporary period (S58). The first calculation unit 33 determines whether or not a chi-square value of the target temporary period exceeds a neighborhood threshold (S59). When the chi-square value of the target temporary period exceeds the neighborhood threshold (Yes in S59), the first calculation unit 33 determines whether or not the chi-square value of the target temporary period exceeds the maximum chi-square value (S60). When the chi-square value of the target temporary period exceeds the maximum chi-square value (Yes in S60), the first calculation unit 33 updates the chi-square value of the target temporary period to the maximum chi-square value (S61) and resets the count number (S62). The count number is obtained by counting the number of times of the arithmetic processing for the chi-square value of the target temporary period after the maximum chi-square value is updated.

The first estimation unit 34 determines whether or not the maximum chi-square value is larger than 0 and the count number is a predetermined number or more (S63). When the maximum chi-square value is not larger than 0 and the count number is not the predetermined number or more (No in S63), the first estimation unit 34 determines whether or not the sampling frequency of the first section length has reached the first sampling frequency (S64). When the sampling frequency of the first section length SU1 has reached the first sampling frequency (Yes in S64), the first estimation unit 34 determines whether or not the maximum chi-square value is larger than 0 (S65).

When the maximum chi-square value is larger than 0 (Yes in S65), the first estimation unit 34 moves to M1 illustrated in FIG. 16. When the maximum chi-square value is not larger than 0 (No in S65), the first estimation unit 34 changes the first section length SU1 and the first sampling frequency (S66) and moves to S53 to start a sampling operation for the first section length SU1.

When there is no temporary period that meets the sampling conditions (No in S55), the first determination unit 32 moves to S55 to keep checking if there is the temporary period that meets the sample conditions. When the chi-square value of the target temporary period does not exceed the neighborhood threshold (No in S59), the first estimation unit 34 increments the count number by +1 (S67). Then, the first estimation unit 34 moves to S63 to determine whether or not the maximum chi-square value is larger than 0 and the count number is a predetermined number or more.

When the chi-square value of the target temporary period does not exceed the maximum chi-square value (No in S60), the first estimation unit 34 moves to S67 to increment the count number by +1. When the maximum chi-square value is larger than 0 and the count number is the predetermined number or more (Yes in S63), the first estimation unit 34 moves to S65 to determine whether or not the maximum chi-square value is larger than 0. For example, the first estimation unit 34 guarantees arithmetic processing of the target temporary period for the predetermined number after updating the maximum chi-square value. When the sampling frequency of the first section length SU1 has not reached the first sampling frequency (No in S64), the first estimation unit 34 moves to S55 to keep checking if there is a temporary period that meets the sample conditions.

In M1 illustrated in FIG. 16, the first estimation unit 34 estimates a temporary period with the maximum chi-square value, among the chi-square values exceeding the neighborhood threshold, as a neighborhood period (S71). When the neighborhood period is estimated in S71, the second collection unit 35 sets a second section length SU2 and a second sampling frequency (S72).

The second collection unit 35 starts a sampling operation for the second section length SU2 (S73) and determines whether or not a sampling frequency of the second section length SU2 has reached the second sampling frequency (S74). When the sampling frequency for the second section length SU2 has reached the second sampling frequency (Yes in S74), the second determination unit 36 determines a plurality of neighborhood temporary periods around the neighborhood period with a multiple of the second section length SU2 (S75).

The second calculation unit 37 increments the number of executions by +1 after determining the neighborhood temporary period (S76), and executes a convolution operation for each neighborhood temporary period (S77). The second calculation unit 37 also conducts a chi-square test on the convolution operation result for each neighborhood temporary period (S78). The second estimation unit 38 determines whether or not the chi-square values for each neighborhood temporary period include a chi-square value exceeding a true threshold (S79). When there is no chi-square value that exceeds the true threshold (No in S79), the second estimation unit 38 determines whether or not the number of executions is N or more (S80).

When the number of executions is not N or more (No in S80), the second estimation unit 38 determines, for example, that the number of executions is less than N, changes the second section length SU2 and the second sampling frequency (S81), and moves to S75 to determine a plurality of neighborhood temporary periods. When the number of executions is N or more (Yes in S80), the second estimation unit 38 moves to S66 in M2 of FIG. 15B to change and set the first section length SU1 and the first sampling frequency.

When there is the chi-square value that exceeds the true threshold (Yes in S79), the second estimation unit 38 resets the number of executions (S82). Then, the second estimation unit 38 estimates the neighborhood temporary period with the maximum chi-square value, among the chi-square values exceeding the true threshold, as the true period (S83) and then terminates the processing operations illustrated in FIG. 16.

Figure 17:
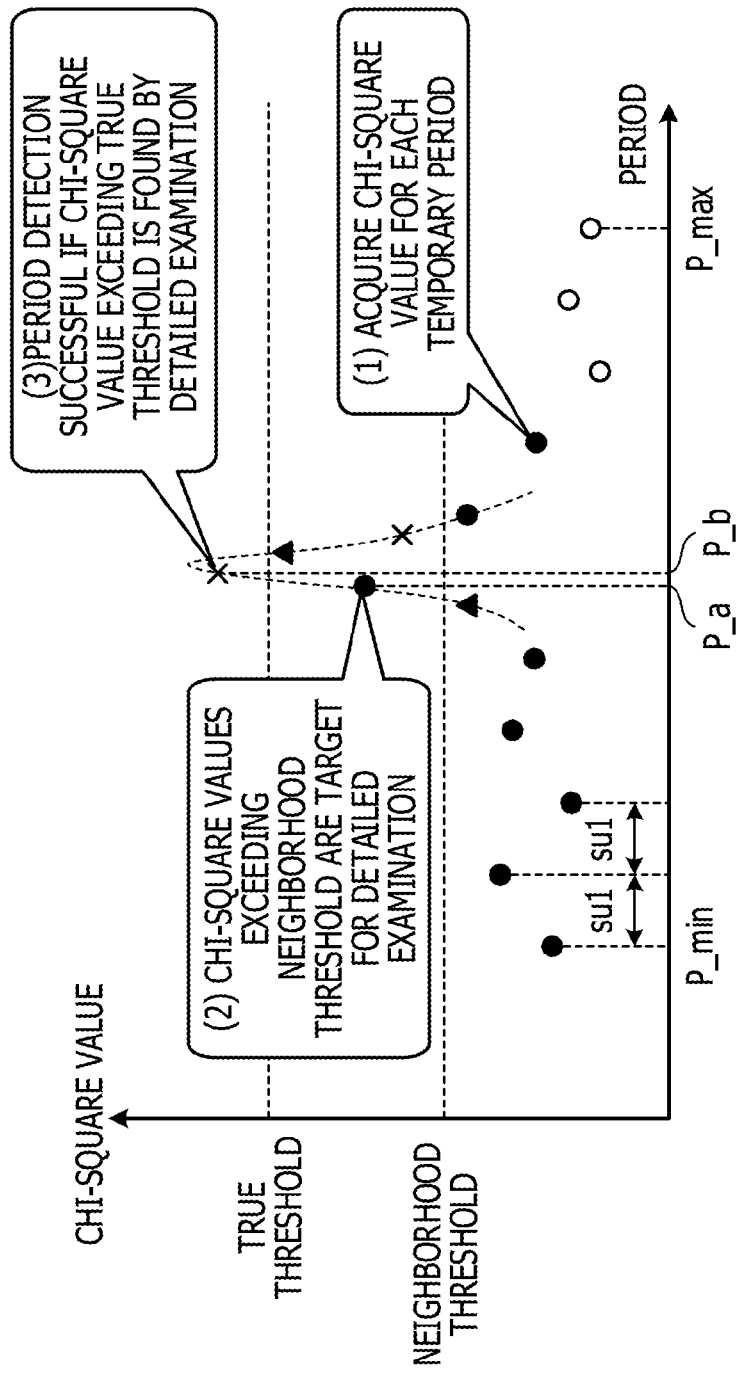
FIG. 17 is an explanatory diagram illustrating a relationship between a chi-square value and a period of arrival packets obtained by the second period detection processing.

FIG. 17 is an explanatory diagram illustrating a relationship between the chi-square value and the period of arrival packets obtained by the second period detection processing. The first determination unit 32 determines temporary periods (Pmin to Pmax) specified with a multiple of the first section length SU1. Then, the first calculation unit 33 sequentially calculates chi-square values (black circles illustrated in FIG. 17) for each temporary period that meets sample conditions. The first estimation unit 34 updates the chi-square value of the temporary period exceeding the neighborhood threshold, among the sequentially calculated chi-square values for each temporary period, to the maximum chi-square value. Thereafter, when the chi-square value of the temporary period for N times is smaller than the maximum chi-square value, the first estimation unit 34 estimates the temporary period with the maximum chi-square value as a neighborhood period Pa. Then, when the temporary period is estimated as the neighborhood period Pa, the first collection unit 31 stops the sampling operation even during the sampling collection. Then, the second calculation unit 37 sequentially calculates chi-square values (black triangles illustrated in FIG. 17) for each neighborhood temporary period specified with a multiple of the second section length SU2 around the neighborhood period. Since the chi-square value of the neighborhood temporary period does not exceed the true threshold, the second determination unit 36 changes the second section length SU2 to the third section length SU3. Then, the second calculation unit 37 sequentially calculates chi-square values (x illustrated in FIG. 17) for each neighborhood temporary period specified with a multiple of the third section length SU3 around the neighborhood period. When the chi-square value of the neighborhood temporary period Pb of the third section length SU3 exceeds the true threshold, the second estimation unit 38 estimates the neighborhood temporary period Pb of the chi-square value exceeding the true threshold as the true period. As a result, the period detection has been successful.

The first calculation unit 33 of Embodiment 2 executes arithmetic processing on the temporary period sequentially from the one in which a sampling amount that enables the arithmetic processing such as a convolution operation and a chi-square test has been successfully obtained. For example, the arithmetic processing is sequentially executed upon completion of the sampling amount of 3×100 times=300 times as a sample condition for the temporary period P1 with n=3 and upon completion of the sampling amount of 4×100 times=400 times as a sample condition for the temporary period P2 with n=4. During sampling, for example, the first calculation unit 33 starts the arithmetic processing of the temporary period P1 upon completion of the sampling amount of 300 times, and starts the arithmetic processing of the temporary period P2 upon completion of the sampling amount of 400 times. For example, the first calculation unit 33 sequentially starts the arithmetic processing in ascending order of temporary period while continuing the sampling operation. As a result, the time required to estimate the neighborhood period may be significantly shortened when the arithmetic processing is started for each temporary period with the sampling amount completed for each temporary period without waiting for the completion of all sampling and when the neighborhood period may be estimated promptly without waiting for the arithmetic processing for all the temporary periods.

The first calculation unit 33 sequentially executes the arithmetic processing for each temporary period that meets the sample conditions. Thus, the neighborhood period may be estimated in the middle of sampling even if all the sampling operations are not completed. As a result, the processing time required to estimate the neighborhood period may be significantly shortened.

The first calculation unit 33 presets a neighborhood threshold and executes arithmetic processing of the temporary period for a predetermined number of times from the point when the neighborhood threshold is exceeded, and a chi-square value exceeds the maximum chi-square value and the maximum chi-square value is updated. When the chi-square value of the temporary period for the predetermined number of times does not exceed he maximum chi-square value after the execution of the arithmetic processing of the temporary period for the predetermined number of times, the first calculation unit 33 terminates subsequent arithmetic processing of the temporary period. As a result, unnecessary arithmetic processing is interrupted rather than waiting for all sampling processing to be completed upon estimation around the neighborhood period. Thus, the processing load may be reduced and the processing time may be significantly shortened.

In Embodiment 2, the arithmetic processing is executed for each temporary period that meets the sample conditions. Therefore, by executing the sampling processing and the arithmetic processing in parallel, the processing time may be significantly shortened while reducing the processing load required to estimate the neighborhood period. As a result, the periodicity of arrival packets may be accurately detected while ensuring the quickness and the lightness.

The first calculation unit 33 determines whether or not the sample conditions are met for each temporary period during collection of the first sampling value by the first collection unit 31. The first calculation unit 33 sequentially calculates the chi-square value for each temporary period that meets the sample conditions. As a result, the neighborhood period may be detected without waiting for all the sampling to be completed. Thus, the processing time required to estimate the neighborhood period may be shortened.

The first calculation unit 33 sequentially calculates the chi-square value for each temporary period that meets the sample conditions and, when the chi-square value of the temporary period exceeds the neighborhood threshold and the maximum chi-square value, sequentially calculates a chi-square value for each temporary period after updating the maximum chi-square value to the chi-square value of the temporary period. After it is determined that the chi-square value of the temporary period does not exceed the maximum chi-square value for a predetermined number of times in a row, the first calculation unit 33 stops the operation of calculating the chi-square value for each temporary period. As a result, unnecessary arithmetic processing after the temporary period of the maximum chi-square value is specified may be suppressed while checking the chi-square value of the temporary period for a predetermined number of times after updating the maximum chi-square value.

When the maximum chi-square value is updated to the chi-square value of the temporary period, the first calculation unit 33 sequentially calculates a chi-square value for each temporary period, and determines whether or not the chi-square value of the temporary period exceeds the maximum chi-square value for a predetermined number of times in a row. As a result, unnecessary arithmetic processing after the temporary period of the maximum chi-square value is specified may be suppressed while checking the chi-square value of the temporary period for a predetermined number of times after updating the maximum chi-square value.

In the above embodiments, it is assumed that the MFH packets are high-priority packets and the non-MFH packets are low-priority packets. However, the packets are not limited to these two kinds but may be changed accordingly. For example, when packets having three kinds of priority are used, three gates are provided and set states of the respective gates are stored in the list table 26. In the above embodiments, the description is given of the case where the true periodicity is estimated for the MFH packets, which are the high-priority packets, as the arrival packets. However, the packets are not limited thereto but may be changed accordingly, and packets of another kind, such as the non-MFH packets, may be used.

In the above embodiments, the arithmetic processing for each temporary period is executed in the first sampling operation, and the arithmetic processing for each neighborhood temporary period is executed in the second sampling operation. However, the embodiments are not limited thereto but may be modified accordingly. For example, the sampling value obtained in the first sampling operation may be used for the arithmetic processing for each neighborhood period.

In the above embodiments, 1 m second is used as a duration of a sub-frame of a radio signal in the fourth generation mobile communication system. However, the duration of the sub-frame is not limited to 1 m second but may be changed accordingly so as to correspond to a radio signal in the fifth generation mobile communication system, for example.

In the above embodiments, the analysis unit 25, the control unit 27, and the list table 26 are provided in the packet processor 12. However, the analysis unit 25, the control unit 27, and the list table 26 may be provided in the FPGA 12D or the CPU 15, for example, and such modification may be made accordingly. The analysis unit 25, the control unit 27, and the list table 26 may be provided over the FPGA 12D or the CPU 15, and such modification may be made accordingly. An ASIC may be used instead of the FPGA 12D, and such modification may be made accordingly.

In the above embodiments, one period of the sub-frame includes N TSs. However, one period of the sub-frame may be set to a multiple of N as long as the periodicity may be maintained, and such modification may be made accordingly.

The constituent elements in the units illustrated in the drawings do not necessarily have to be physically configured as illustrated therein. For example, specific modes of dispersion and integration of the respective units are not limited to those illustrated in the drawings, but all or some of the elements may be configured as functionally or physically dispersed and integrated by arbitrary unit depending on various loads, usage, and the like.

As for the various processing functions executed in each device, all or any part thereof may be executed on a central processing unit (CPU) (or a microcomputer such as a micro processing unit (MPU) or a micro controller unit (MCU)). Needless to say, all or any part of the various processing functions may be executed on a program for analysis and execution using the CPU (or microcomputer such as the MPU or MCU) or on wired logic hardware.

Figure 18:
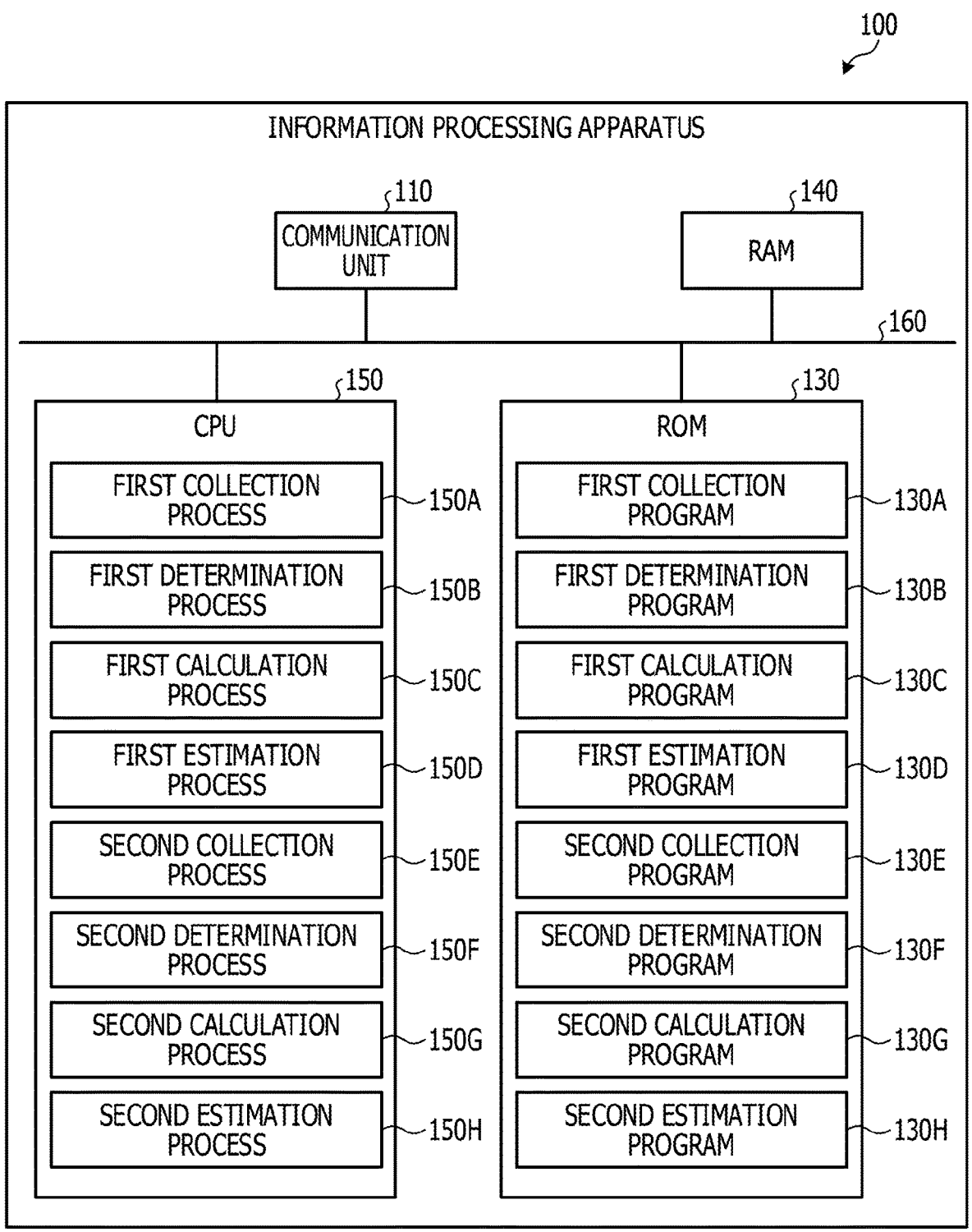
FIG. 18 is an explanatory diagram illustrating an example of an information processing apparatus that executes a packet processing program.

The various processing described in the embodiments may be realized by executing prepared programs with a processor such as the CPU in an information processing apparatus. Hereinafter, description is given of an example of an information processing apparatus that executes a program having the same functions as those of the above embodiments. FIG. 18 is an explanatory diagram illustrating an example of an information processing apparatus that executes a packet processing program.

An information processing apparatus 100 that executes the packet processing program illustrated in FIG. 18 includes a communication unit 110, a read only memory (ROM) 130, a random access memory (RAM) 140, and a CPU 150. The communication unit 110, the ROM 130, the RAM 140, and the CPU 150 are connected to each other through a bus 160. The communication unit 110 receives packets.

The ROM 130 has the packet processing program previously stored therein to exert the same functions as those in the above embodiments. As the packet processing program, a first collection program 130A, a first determination program 130B, a first calculation program 130C, and a first estimation program 130D are stored in the ROM 130. As the packet processing program, a second collection program 130E, a second determination program 130F, a second calculation program 130G, and a second estimation program 130H are stored in the ROM 130. The packet processing program may be recorded in a computer-readable recording medium with an unillustrated drive, rather than the ROM 130. As the recording medium, for example, a CD-ROM, a DVD disk, a portable recording medium such as a USB memory, a semiconductor memory such as a flash memory, and the like may be used.

The CPU 150 functions as a first collection process 150A by reading the first collection program 130A from the ROM 130. The CPU 150 functions as a first determination process 150B by reading the first determination program 130B from the ROM 130. The CPU 150 functions as a first calculation process 150C by reading the first calculation program 130C from the ROM 130. The CPU 150 functions as a first estimation process 150D by reading the first estimation program 130D from the ROM 130.

The CPU 150 functions as a second collection process 150E by reading the second collection program 130E from the ROM 130. The CPU 150 functions as a second determination process 150F by reading the second determination program 130F from the ROM 130. The CPU 150 functions as a second calculation process 150G by reading the second calculation program 130G from the ROM 130. The CPU 150 functions as a second estimation process 150H by reading the second estimation program 130H from the ROM 130.

The CPU 150 collects an amount of packets arriving in each first section length as a first sampling value. The CPU 150 determines a plurality of temporary periods with a multiple of the first section length. The CPU 150 calculates a statistical value obtained by quantifying a bias in the amount of packets arriving in each first section length, for each of the temporary periods, based on the first sampling value sorted for each temporary period. The CPU 150 estimates the temporary period with the maximum statistical value, among the statistical values calculated for each temporary period, as a neighborhood period. The CPU 150 collects an amount of packets arriving in each second section length different from the first section length as a second sampling value. The CPU 150 determines a plurality of neighborhood temporary periods, which are temporary periods around the neighborhood period. The CPU 150 calculates a statistical value for each neighborhood temporary period based on the second sampling value sorted for each neighborhood temporary period. The CPU 150 estimates the neighborhood temporary period with the maximum statistical value, among the statistical values calculated for each neighborhood temporary period, as a true period of the arriving packets. As a result, output delay of arriving specific packets may be suppressed.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A packet processing device configured to control output of arriving packets based on a periodicity of the arriving packets, the packet processing device comprising:
a memory; and
a processor coupled to the memory and configured to:
acquire an amount of packets arriving in each first section length as a first sampling value,
determine a plurality of temporary periods based on a multiple of the first section length,
calculate, for each of the plurality of temporary periods, a statistical value obtained by quantifying a bias in the amount of packets arriving in each first section length based on the first sampling value sorted for each temporary period,
estimate the temporary period having a maximum statistical value, among the statistical values calculated for each temporary period, as a neighborhood period,
acquire an amount of packets arriving in each second section length different from the first section length as a second sampling value,
determine a plurality of neighborhood temporary periods, which are temporary periods around the neighborhood period,
calculate a statistical value for each neighborhood temporary period based on the second sampling value sorted for each neighborhood temporary period,
estimate the neighborhood temporary period having the maximum statistical value, among the statistical values calculated for each neighborhood temporary period, as a true period of the arriving packets, and
set the estimated true period as the periodicity.

2. The packet processing device according to claim 1, wherein the processor is configured to
estimate a temporary period having the maximum statistical value, which exceeds a first threshold close to the statistical value around the neighborhood period, among the statistical values calculated for each temporary period, as the neighborhood period.

3. The packet processing device according to claim 1, wherein the processor is configured to estimate a neighborhood temporary period with the maximum statistical value, which exceeds a second threshold close to the statistical value around the true period, among the statistical values calculated for each neighborhood temporary period, as the true period.

4. The packet processing device according to claim 1, wherein the processor is configured to calculate a statistical value for each temporary period based on the first sampling value sorted for each temporary period after collecting all the first sampling values.

5. The packet processing device according to claim 1, wherein the processor is configured to determine the neighborhood temporary period around the neighborhood period with a multiple of the second section length.

6. The packet processing device according to claim 1, wherein the processor is configured to:
determine whether or not collection of a sampling amount that enables calculation of a statistical value for each temporary period is completed, among the first sampling values, during collection of the first sampling values, and
sequentially calculate the statistical value for each temporary period in which the collection of the sampling amount that enables calculation of the statistical value is completed.

7. The packet processing device according to claim 1, wherein the processor is configured to:
sequentially calculate the statistical value for each temporary period in which the collection of the sampling amount that enables calculation of the statistical value is completed,
when the calculated statistical value of the temporary period exceeds a first threshold close to the statistical value around the neighborhood period and exceeds a comparison value, update the comparison value to the statistical value of the temporary period, and sequentially calculate the statistical value for each temporary period,
stop the operation of calculating the statistical value for each temporary period after it is determined that the statistical value of the temporary period does not exceed the comparison value for a predetermined number of times in a row, and
estimate the temporary period with the maximum statistical value, among the calculated statistical values of the temporary period, as the neighborhood period.

8. The packet processing device according to claim 7, wherein the processor is configured to:
sequentially calculate the statistical value for each temporary period when the comparison value is updated to the statistical value of the temporary period, and
determine whether or not the statistical value of the temporary period exceeds the comparison value for a predetermined number of times in a row.

9. The packet processing device according to claim 1, wherein the processor is configured to:
perform a convolution operation of the amount of packets arriving in each first section length of each temporary period, for each temporary period, and
calculate a chi-square value for each temporary period as the statistical value by conducting a chi-square test on the convolution operation result for each temporary period.

10. A transmission apparatus, comprising:
a packet processing device configured to control output of arriving packets based on a periodicity of the arriving packets,
wherein the packet processing device includes:
a memory; and
a processor coupled to the memory and configured to:
acquire an amount of packets arriving in each first section length as a first sampling value,
determine a plurality of temporary periods based on a multiple of the first section length,
calculate, for each of the plurality of temporary periods, a statistical value obtained by quantifying a bias in the amount of packets arriving in each first section length, based on the first sampling value sorted for each temporary period,
estimate the temporary period having a maximum statistical value, among the statistical values calculated for each temporary period, as a neighborhood period, acquire an amount of packets arriving in each second section length different from the first section length as a second sampling value, determine a plurality of neighborhood temporary periods, which are temporary periods around the neighborhood period, calculate a statistical value for each neighborhood temporary period based on the second sampling value sorted for each neighborhood temporary period, estimate the neighborhood temporary period having the maximum statistical value, among the statistical values calculated for each neighborhood temporary period, as a true period of the arriving packets, and set the estimated true period as the periodicity.

11. A packet processing method executed by a processor included in a packet processing device configured to control output of arriving packets based on a periodicity of the arriving packets, the packet processing method comprising:

acquiring an amount of packets arriving in each first section length as a first sampling value;

determining a plurality of temporary periods with a multiple of the first section length;

calculating, for each of the plurality of temporary periods, a statistical value obtained by quantifying a bias in the amount of packets arriving in each first section length, based on the first sampling value sorted for each temporary period;

estimating the temporary period having a maximum statistical value, among the statistical values calculated for each temporary period, as a neighborhood period;

acquiring an amount of packets arriving in each second section length different from the first section length as a second sampling value;

determining a plurality of neighborhood temporary periods, which are temporary periods around the neighborhood period;

calculating a statistical value for each neighborhood temporary period based on the second sampling value sorted for each neighborhood temporary period;

estimating the neighborhood temporary period having a maximum statistical value, among the statistical values calculated for each neighborhood temporary period, as a true period of the arriving packets; and setting the estimated true period as the periodicity.

12. The packet processing method according to claim 11, wherein the estimating of the neighborhood period includes estimating a temporary period having the maximum statistical value, which exceeds a first threshold close to the statistical value around the neighborhood period, among the statistical values calculated for each temporary period, as the neighborhood period.

13. The packet processing method according to claim 11, wherein the estimating of the true period includes estimating a neighborhood temporary period with the maximum statistical value, which exceeds a second threshold close to the statistical value around the true period, among the statistical values calculated for each neighborhood temporary period, as the true period.

14. The packet processing method according to claim 11, wherein the calculating of the statistical value includes calculating the statistical value for each temporary period based on the first sampling value sorted for each temporary period after collecting all the first sampling values.

15. A non-transitory computer-readable storage medium storing a program that causes a packet processing device to execute a process, the packet processing device being configured to control output of arriving packets based on a periodicity of the arriving packets, the process comprising:

acquiring an amount of packets arriving in each first section length as a first sampling value;

determining a plurality of temporary periods with a multiple of the first section length;

calculating, for each of the plurality of temporary periods, a statistical value obtained by quantifying a bias in the amount of packets arriving in each first section length, based on the first sampling value sorted for each temporary period;

estimating the temporary period having a maximum statistical value, among the statistical values calculated for each temporary period, as a neighborhood period;

acquiring an amount of packets arriving in each second section length different from the first section length as a second sampling value;

determining a plurality of neighborhood temporary periods, which are temporary periods around the neighborhood period;

calculating a statistical value for each neighborhood temporary period based on the second sampling value sorted for each neighborhood temporary period; and estimating the neighborhood temporary period having the maximum statistical value, among the statistical values calculated for each neighborhood temporary period, as a true period of the arriving packets; and setting the estimated true period as the periodicity.

* * * * *